US012127190B2

(12) United States Patent
Muruganathan et al.

(10) Patent No.: US 12,127,190 B2
(45) Date of Patent: Oct. 22, 2024

(54) SYSTEMS AND METHODS FOR NON-CODEBOOK BASED MULTI-TRP PUSCH

(71) Applicant: Telefonaktiebolaget LM Ericsson (publ), Stockholm (SE)

(72) Inventors: Siva Muruganathan, Stittsville (CA); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/552,850

(22) PCT Filed: Apr. 4, 2022

(86) PCT No.: PCT/IB2022/053114
§ 371 (c)(1),
(2) Date: Sep. 27, 2023

(87) PCT Pub. No.: WO2022/208482
PCT Pub. Date: Oct. 6, 2022

(65) Prior Publication Data
US 2024/0098740 A1 Mar. 21, 2024

Related U.S. Application Data

(60) Provisional application No. 63/170,001, filed on Apr. 2, 2021.

(51) Int. Cl.
*H04L 5/00* (2006.01)
*H04L 1/08* (2006.01)
(Continued)

(52) U.S. Cl.
CPC ........... *H04W 72/1268* (2013.01); *H04L 1/08* (2013.01); *H04L 5/0051* (2013.01); *H04W 72/232* (2023.01)

(58) Field of Classification Search
CPC .. H04W 72/1268; H04W 72/232; H04L 1/08; H04L 5/0051
See application file for complete search history.

(56) References Cited

U.S. PATENT DOCUMENTS

2019/0349964 A1* 11/2019 Liou ..................... H04W 76/27
2020/0204293 A1*  6/2020 Kim ...................... H04L 5/0053
(Continued)

FOREIGN PATENT DOCUMENTS

WO       2022025590 A1    2/2022

OTHER PUBLICATIONS

Author Unknown, "Technical Specification Group Radio Access Network; NR; Physical channels and modulation (Release 16)," Technical Specification 38.211, Version 16.5.0, Mar. 2021, 3GPP Organizational Partners, 134 pages.
(Continued)

*Primary Examiner* — Chi A Lee
*Assistant Examiner* — Andrew Lee
(74) *Attorney, Agent, or Firm* — Withrow & Terranova, PLLC

(57) ABSTRACT

Systems and methods for non-codebook based multi-Transmit and Reception Point (TRP) Physical Uplink Shared Channel (PUSCH) are provided. In some embodiments, a method performed by a wireless device includes: receiving a configuration of a first or second Phase-Tracking Reference Signals (PT-RS) port index per Sounding Reference Signal (SRS) resource in two SRS resource sets for non-codebook based PUSCH; receiving indication of: a first set of SRS Resource Indicators (SRIs) from a first SRS resource set; and/or a second set of SRIs from a second SRS resource set; determining at least one of: a first number of PT-RS ports to be transmitted according to the SRS resources indicated in the first set of SRIs; and a second number of
(Continued)

PT-RS ports to be transmitted according to the SRS resources indicated in the second set of SRIs; and transmitting the determined number of PT-RS ports along with a plurality of PUSCH repetitions.

28 Claims, 18 Drawing Sheets

(51) Int. Cl.
*H04W 72/1268* (2023.01)
*H04W 72/232* (2023.01)

(56) References Cited

U.S. PATENT DOCUMENTS

| | | | | |
|---|---|---|---|---|
| 2020/0412503 | A1* | 12/2020 | Huang | H04L 5/0091 |
| 2021/0036746 | A1* | 2/2021 | Liu | H04B 7/0456 |
| 2021/0044385 | A1 | 2/2021 | Hosseini et al. | |
| 2021/0345285 | A1* | 11/2021 | Tenny | H04W 24/10 |
| 2023/0179281 | A1* | 6/2023 | Svedman | H04L 5/0094 |
| | | | | 455/101 |
| 2023/0232415 | A1* | 7/2023 | Kim | H04W 72/232 |
| | | | | 370/329 |
| 2023/0284230 | A1* | 9/2023 | Cirik | H04L 5/0032 |
| | | | | 370/328 |
| 2023/0362927 | A1* | 11/2023 | Sun | H04W 72/1268 |
| 2023/0371042 | A1* | 11/2023 | Mei | H04L 1/08 |

OTHER PUBLICATIONS

Author Unknown, "Technical Specification Group Radio Access Network; NR; Multiplexing and channel coding (Release 16)," Technical Specification 38.212, Version 16.4.0, Dec. 2020, 3GPP Organizational Partners, 152 pages.

Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.

Author Unknown, "Technical Specification Group Radio Access Network; NR; Physical layer procedures for data (Release 16)," Technical Specification 38.214, Version 16.4.0, Dec. 2020, 3GPP Organizational Partners, 169 pages.

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

Nokia, et al., "R1-2101006: Enhancements for Multi-TRP URLLC schemes," 3GPP TSG RAN WG1 #104-e Meeting, Jan. 25-Feb. 5, 2021, 22 pages.

International Search Report and Written Opinion for International Patent Application No. PCT/IB2022/053114, mailed Aug. 16, 2022, 16 pages.

International Preliminary Report on Patentability for International Patent Application No. PCT/IB2022/053114, mailed Mar. 23, 2023, 7 pages.

* cited by examiner

SYSTEMS AND METHODS FOR NON-CODEBOOK BASED MULTI-TRP PUSCH

RELATED APPLICATIONS

This application is a 35 U.S.C. § 371 national phase filing of International Application No. PCT/IB2022/053114, filed Apr. 4, 2022, which claims the benefit of provisional patent application Ser. No. 63/170,001, filed Apr. 2, 2021, the disclosures of which are hereby incorporated herein by reference in their entireties.

TECHNICAL FIELD

The disclosure relates generally to non-codebook based transmission.

BACKGROUND

NR uses CP-OFDM (Cyclic Prefix Orthogonal Frequency Division Multiplexing) in both downlink (DL) (i.e., from a network node, gNB, or base station, to a user equipment or UE) and uplink (UL) (i.e., from UE to gNB). DFT spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically in slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15\times 2^\mu)$ kHz where $\mu \in \{0, 1, 2, 3, 4\}$. $\Delta f=15$ kHz is the basic subcarrier spacing. The slot durations at different subcarrier spacings is given by $\frac{1}{2^\mu}$ ms.

In the frequency domain, a system bandwidth is divided into resource blocks (RBs), each corresponds to 12 contiguous subcarriers. The RBs are numbered starting with 0 from one end of the system bandwidth. The basic NR physical time-frequency resource grid is illustrated in FIG. 2, where only one Resource Block (RB) within a 14-symbol slot is shown. One OFDM subcarrier during one OFDM symbol interval forms one resource element (RE).

In NR Rel-15, uplink (UL) data transmission can be dynamically scheduled by an uplink grant contained in Downlink Control Information (DCI) carried by a Physical Downlink Control Channel (PDCCH). A UE first decodes the uplink grant and then transmits a PUSCH based on the decoded control information in the uplink grant.

In addition to dynamic scheduling, NR also supports PUSCH transmission with Configured Grant (CG). There are two types of CGs, i.e., Type 1 and Type 2, defined in NR. In CG type 1, the periodicity as well as the start and stop of a PUSCH transmission are configured semi-statically by RRC. In CG type 2, the periodicity is configured by RRC while the start and stop of a PUSCH transmission is signaled dynamically by DCI.

There are three UL DCI formats supported in NR, i.e., DCI format 0_0, DCI format 0_1, and DCI format 0_2. Each of the DCI contains a number of bit fields each conveys certain information, including one or more of

- Sounding Reference Signal (SRS) Resource Indicator (SRI)
- Precoding information and number of layers
- TPC (Transmit Power Control) command for scheduled PUSCH SRI is used to indicate a SRS resource or resources associated with a PUSCH. "Precoding information and number of layers" is used to indicate a Transmit Precoding Matrix Indicator (TPMI) and a rank for the PUSCH. TPC is used to indicate a closed-loop power correction for the PUSCH.

In NR Rel-15, slot based PUSCH repetition (or PUSCH repetition Type A) is supported in which the number of aggregated slots for both dynamic scheduled and configured grant Type 2 are RRC configured. In NR Rel-16, this was enhanced so that the number of repetitions can be dynamically indicated, i.e., change from one PUSCH scheduling occasion to the next. That is, in addition to the starting symbol S, and the length of the PUSCH L, a number of nominal repetitions K is signaled as part of Time-Domain Resource Allocation (TDRA).

PUSCH repetition Type B is introduced in NR Rel-16 in which a PUSCH can be repeated in multiple mini-slots. When scheduling a transmission with PUSCH repetition Type B, in addition to the starting symbol S, and the length of the PUSCH L, a number of nominal repetitions K is signaled as part of TDRA.

PUSCH Transmission Schemes

In NR, there are two PUSCH transmission schemes, i.e., codebook based and non-codebook based schemes.

Codebook Based PUSCH Scheme

Codebook based PUSCH is enabled if higher layer parameter txConfig=codebook. For dynamically scheduled PUSCH and configured grant PUSCH type 2, the Codebook based PUSCH transmission scheme can be summarized as follows:

- A PUSCH is associated with one of one or two SRS resources in an SRS resource set with a higher layer parameter usage set to 'CodeBook'. Note that only a single SRS resource set can be configured with usage set to "codebook".
- the gNB determines a rank and a preferred UL precoder in a codebook based on a selected UL Sounding Reference Signal (SRS) resource among one or two SRS resources configured in a SRS resource set.
- the gNB indicates the selected SRS resource via a 1-bit SRI field in a DCI scheduling the PUSCH. The SRI field is not present in the DCI if there is only one SRS resource configured in the SRS resource set.
- The gNB also indicates the rank and the preferred UL precoder via a 'Precoding information and number of layers' field in a DCI.
- the UE performs PUSCH transmission using the indicated TPMI and the rank on its antenna ports associated with the indicated SRS resource. The PUSCH is spatially related to the most recent SRS transmission in the indicated SRS resource.

Up to NR Rel-16, only a single SRS resource set can be configured with usage set to "codebook".

Non-Codebook Based PUSCH Scheme

Non-Codebook based UL transmission is available in NR, enabling reciprocity-based UL transmission. Non-Codebook based PUSCH in NR is enabled if higher layer parameter txConfig=noncodebook. Note that in NR Rel-15/16, the number of SRS resource sets with higher layer parameter usage set to 'nonCodeBook' is limited to one (i.e., only one SRS resource set is allowed to be configured for the purposes of non-Codebook based PUSCH transmission). The maximum number of SRS resources that can be configured for non-codebook based uplink transmission is 4.

By assigning a DL CSI-RS to the UE, the UE can measure and deduce suitable precoder weights for PUSCH transmission of up to four spatial layers. The candidate precoder weights are transmitted using up to four single-port SRS resources corresponding to the spatial layers. Subsequently, the gNB indicates the transmission rank and multiple SRS resource indicators, jointly encoded using $$\left\lceil \log_2\left(\sum_{k=1}^{min\{L_{max}, N_{SRS}\}} \binom{N_{SRS}}{k}\right)\right\rceil \text{ bits,}$$

where $N_{SRS}$ indicates the number of configured SRS resources, and $L_{max}$ is the maximum number of supported layers for PUSCH. Table 1 shows a mapping of codepoints of the SRI field to SRI(s) for different number of $N_{SRS}$ when $L_{max}=4$.

When $N_{SRS}=4$ and the SRI bit field is mapped to index 12, then PUSCH will be transmitted using the same antenna ports as the SRS port(s) in the 1st, 3rd, and 4th SRS resources configured in the SRS resource set (i.e., 3 PUSCH layers transmitted).

When $N_{SRS}=4$ and the SRI bit field is mapped to index 5, then PUSCH will be transmitted using the same antenna ports as the SRS port(s) in the 1st and 3rd SRS resources configured in the SRS resource set (i.e., 2 PUSCH layers transmitted).

When $N_{SRS}=4$ and the SRI bit field is mapped to index 3, then PUSCH will be transmitted using the same antenna port as the SRS port in the 4th SRS resource configured in the SRS resource set (i.e., 1 PUSCH layers transmitted).

TABLE 1

SRI indication for non-codebook based PUSCH transmission, $L_{max} = 4$ (reproduced from Table 7.3.1.1.2-31 of 3GPP TS38.212 v16.4.0)

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
| --- | --- | --- | --- | --- | --- |
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14 | 0, 1, 2, 3 |
|   |   |   |   | 15 | reserved |

With regards to Non-codebook based PUSCH, the following is specified in 3GPP TS 38.214 V16.0.0:

"For non-codebook based transmission, the UE can calculate the precoder used for the transmission of SRS based on measurement of an associated NZP CSI-RS resource. A UE can be configured with only one NZP CSI-RS resource for the SRS resource set with higher layer parameter usage in SRS-ResourceSet set to 'nonCodebook' if configured."

Hence, for non-codebook based PUSCH transmission, only one NZP CSI-RS resource is configured in the SRS resource set, and the UE can calculate the precoder used for the transmission of SRS using this associated NZP CSI-RS resource. The single NZP CSI-RS resource configured per SRS resource set is part of the SRS-Config information element and is shown below. The condition 'NonCodebook' means that the associated NZP CSI-RS is optionally present in case of the SRS resource set configured with usage set to 'nonCodeBook', otherwise the field is absent.

SRS-Config information element

```
-- ASN1START
-- TAG-SRS-CONFIG-START
...
SRS-ResourceSet ::=                     SEQUENCE {
    srs-ResourceSetId                       SRS-ResourceSetId,
    srs-ResourceIdList
ResourcesPerSet)) OF SRS-ResourceId     SEQUENCE (SIZE(1..maxNrofSRS-
                                        OPTIONAL, -- Cond Setup
    resourceType                            CHOICE {
        aperiodic                               SEQUENCE {
            aperiodicSRS-ResourceTrigger            INTEGER (1..maxNrofSRS-
TriggerStates-1),
            csi-RS                                  NZP-CSI-RS-ResourceId
OPTIONAL, -- Cond NonCodebook
            slotOffset                              INTEGER (1..32)
OPTIONAL, -- Need S
            ...,
            [[
            aperiodicSRS-ResourceTriggerList        SEQUENCE (SIZE(1..maxNrofSRS-
TriggerStates-2))

OF INTEGER
(1..maxNrofSRS-TriggerStates-1)         OPTIONAL -- Need M
            ]]
    },
        semi-persistent                         SEQUENCE {
            associatedCSI-RS                        NZP-CSI-RS-ResourceId
```

| SRS-Config information element |  |
| --- | --- |
| ```
OPTIONAL,   -- Cond NonCodebook
    ...
  },
  periodic                          SEQUENCE {
    associatedCSI-RS                  NZP-CSI-RS-ResourceId
OPTIONAL,   -- Cond NonCodebook
    ...
  }
 },
 usage                              ENUMERATED {beamManagement, codebook,
nonCodebook, antennaSwitching},
 alpha                              Alpha
OPTIONAL,   -- Need S
 p0                                 INTEGER (-202..24)
OPTIONAL,   -- Cond Setup
 pathlossReferenceRS                CHOICE {
   ssb-Index                          SSB-Index,
   csi-RS-Index                       NZP-CSI-RS-ResourceId
 }
OPTIONAL,   -- Need M
 srs-PowerControlAdjustmentStates   ENUMERATED { sameAsFci2,
separateClosedLoop}          OPTIONAL,   -- Need S
    ...
}
SRS-ResourceSetId ::=                INTEGER (0..maxNrofSRS-ResourceSets-1)
}
-- TAG-SRS-CONFIG-STOP
-- ASN1STOP
``` | |

It is further specified in 3GPP TS 38.214 that if the UE is configured with an SRS resource set with an associated NZP CSI-RS resource, then the UE is not expected to be configured with spatial relation information in any of the SRS resources in the SRS resource set.

In NR, for non-codebook based PUSCH, the UE performs a one-to-one mapping from the indicated SRI(s) to the indicated Demodulation Reference Signal (DM-RS) port(s) and their corresponding PUSCH layers $\{0 \ldots v-1\}$ in increasing order. The UE shall transmit PUSCH using the same antenna ports as the SRS port(s) in the SRS resource(s) indicated by SRI(s), where the SRS port in (i+1)-th SRS resource in the SRS resource set is indexed as $p_i=1000+i$.

Up to NR Rel-16, only a single SRS resource set can be configured with usage set to "nonCodebook".

Phase-Tracking Reference Signals (PT-RS) for PUSCH in NR

In NR, Phase Tracking Reference Signal (PT-RS) can be configured for PUSCH transmissions in order for the receiver to correct phase noise related errors. PT-RS can be configured with the higher layer parameter PTRS-UplinkConfig in DMRS-UplinkConfig for PUSCH scheduled by DCI format 0_1 or DCI format 0_2.

In NR Rel.15, either one or two PT-RS ports for PUSCH are supported. Each PT-RS port is associated with one of the DM-RS ports for the PUSCH. The maximum number of configured PT-RS ports is given by the higher layer parameter maxNrofPorts in PTRS-UplinkConfig based on the UE reported need. If a UE has reported the capability of supporting full-coherent UL transmission, one PT-RS port is expected to be configured if needed.

In the frequency domain, a PT-RS can be in at most one subcarrier per 2 PRBs. Also, the subcarrier used for a PT-RS port must be one of the subcarriers also used for the DM-RS port associated with the PT-RS port. For DM-RS configuration type 1, a DM-RS port is mapped to every second subcarrier. Consequently, an associated PT-RS can only be mapped to one out of 6 subcarriers. An offset can be configured to determine which subcarrier the DM-RS is mapped to (see Table 6.4.1.2.2.1-1 in 3GPP TS 38.211).

In the time domain, a PT-RS can be configured with a time density of 1, 2, or 4, corresponding to PT-RS in every OFDM symbol, every second OFDM symbols, or every fourth OFDM symbols in a slot, respectively. The modulated symbol used for the PT-RS is the same as the associated DM-RS at the same subcarrier.

A PT-RS example is shown in FIG. 3, where the PT-RS port is associated with DM-RS port 0 and has a subcarrier offset of 4 and a time density of 2. An example of PT-RS REs in a RB with time density 2 and subcarrier offset of 4.

Uplink PT-RS Transmission for Non-Codebook Based PUSCH

For non-codebook based PUSCH, the maximum number of PT-RS ports in the uplink is configured to the UE via the PTRS-UplinkConfig information element in RRC (see 3GPP TS 38.331 V16.2.0). Each SRS resource configured in the SRS resource set with usage set to 'nonCodeBook' is configured with a PT-RS port index as shown below (i.e., ptrs-PortIndex).

| SRS-Config information element |  |
| --- | --- |
| ```
-- ASN1START
-- TAG-SRS-CONFIG-START
...
SRS-Resource ::=                  SEQUENCE {
  srs-ResourceId                    SRS-ResourceId,
  nrofSRS-Ports                     ENUMERATED {port1, ports2,
                                    ports4},
  ptrs-PortIndex                    ENUMERATED {n0, n1}
                                       OPTIONAL,
 -- Need R
  transmissionComb                  CHOICE {
    n2                                SEQUENCE {
      combOffset-n2                     INTEGER (0..1),
      cyclicShift-n2                    INTEGER (0..7)
    },
    n4                                SEQUENCE {
``` | |

-continued

| SRS-Config information element | |
|---|---|
| combOffset-n4 | INTEGER (0..3), |
| cyclicShift-n4 | INTEGER (0..11) |
| } | |
| }, | |
| resourceMapping | SEQUENCE { |
|   startPosition | INTEGER (0..5), |
|   nrofSymbols | ENUMERATED {n1, n2, n4}, |
|   repetitionFactor | ENUMERATED {n1, n2, n4} |
| }, | |
| freqDomainPosition | INTEGER (0..67), |
| freqDomainShift | INTEGER (0..268), |
| freqHopping | SEQUENCE { |
|   c-SRS | INTEGER (0..63), |
|   b-SRS | INTEGER (0..3), |
|   b-hop | INTEGER (0..3) |
| }, | |
| groupOrSequenceHopping | ENUMERATED { neither, groupHopping, sequenceHopping }, |
| resourceType | CHOICE { |
|   aperiodic | SEQUENCE { |
|   ... | |
|   }, | |
|   semi-persistent | SEQUENCE { |
|     periodicityAndOffset-sp | SRS-PeriodicityAndOffset, |
|   ... | |
|   }, | |
|   periodic | SEQUENCE { |
|     periodicityAndOffset-p | SRS-PeriodicityAndOffset, |
|   ... | |
|   } | |
| }, | |
| sequenceId | INTEGER (0..1023), |
| spatialRelationInfo | SRS-SpatialRelationInfo |
| OPTIONAL, -- Need R | |
| ..., | |
| [[ | |
| resourceMapping-r16 | SEQUENCE { |
|   startPosition-r16 | INTEGER (0..13), |
|   nrofSymbols-r16 | ENUMERATED {n1, n2, n4}, |
|   repetitionFactor-r16 | ENUMERATED {n1, n2, n4} |
| } | |
| OPTIONAL -- Need R | |
| ]] | |
| } | |
| ... | |
| -- TAG-SRS-CONFIG-STOP | |
| -- ASN1STOP | |

According to 3GPP TS 38.214 V16.4.0, for non-codebook based PUSCH transmission, the actual number of UL PT-RS port(s) to be transmitted by the UE is determined based on the SRI(s) indicated for non-codebook based PUSCH transmission. The SRI(s) may be indicated via an SRS resource indicator field in DCI (either in DCI format 0_1 or DCI format 0_2) or higher layer configured via RRC configuration parameter rrc-ConfiguredUplinkGrant.

If all the SRI(s) indicated have the same PT-RS port index, then only a single PT-RS port is transmitted for non-codebook based PUSCH. However, if some of the SRI(s) indicated have the corresponding SRS resource(s) configured with PT-RS port index n0, and other SRI(s) indicated have the corresponding SRS resource(s) configured with PT-RS port index n1, then two PT-RS ports are transmitted for non-codebook based PUSCH Transmitting a UL Signal to Multiple TRPs Up to NR rel-16, it is assumed that PUSCH is always transmitted to a same single Transmit and Reception Point (TRP) by a UE. In NR Rel-17, an PUSCH enhancement is to be introduced in which a PUSCH scheduled by a single DCI or PUSCH that is configured via configured grant (i.e., via the rrc-ConfiguredUplinkGrant parameter as defined in 3GPP TS 38.331 V16.2.0) can be repeated towards to two TRPs (i.e., multi-TRP PUSCH repetition schemes). To support that, it was agreed that two SRS resource sets can be configured, each associated with one of the two TRPs for both codebook based and non-codebook based PUSCH schemes. In addition, a UE may be indicated with two SRIs, two TMPIs, two TPCs, each associated one of two TRPs.

In the RAN1 #104e-bis meeting held in January-February 2021, it was agreed that for multi-TRP PUSCH repetition two SRI field(s) are to be included in DCI formats 0_1 and 0_2 that schedule the multi-TRP PUSCH repetition schemes. Each of the two SRI fields is used to indicate SRIs from each of the two SRS resource sets configured for non-codebook based PUSCH transmission. That is, the first SRI field can indicate one or more SRS resources from the first SRS resource set configured for non-codebook based PUSCH, and the second SRI field can indicate one or more SRS resources from the second SRS resource set configured for non-codebook based PUSCH.

It was also agreed in the RAN1 #104e-bis meeting that the same number PUSCH layers will be transmitted over the different repetitions targeting the different TRPs. Note that the different TRPs here correspond to different SRS resource sets configured for non-codebook based PUSCH. Due to the fact that the same number of PUSCH layers will be transmitted to the two TRPs, the number of SRS resources (i.e., number of SRIs) indicated by the two SRI fields are the same in NR Rel-17.

There currently exist certain challenge(s). In existing NR Rel-15 and Rel-16 specifications, the actual number of UL PT-RS ports transmitted for non-codebook based PUSCH is determined based on the SRIs indicated. In NR Rel-15 and Rel-16, only a single set of SRIs are indicated to the UE for non-codebook based PUSCH transmission, and this existing solution supports non-codebook based PUSCH transmission towards a single TRP. However, this solution is not suitable for non-codebook based PUSCH transmitted towards two different TRPs as two different sets of SRIs are indicated to the UE in the multi-TRP case. Hence, how to determine the actual number of UL PT-RS ports for non-codebook based multi-TRP PUSCH is an open problem that needs to be solved.

SUMMARY

Systems and methods for non-codebook based multi-Transmit and Reception Point (TRP) Physical Uplink Shared Channel (PUSCH) are provided. In some embodiments, a method performed by a wireless device for non-codebook based PUSCH transmission includes: receiving a configuration of a first or second Uplink (UL) Phase-Tracking Reference Signals (PT-RS) port index per Sounding Reference Signal (SRS) resource among a plurality of SRS resources configured in two SRS resource sets for non-codebook based PUSCH; receiving an indication of at least one of: a first set of SRS Resource Indicators (SRIs) indicating SRS resources from a first SRS resource set; and a second set of SRIs indicating SRS resources from a second SRS resource set; determining at least one of: a first number of UL PT-RS ports to be transmitted according to the SRS resources indicated in the first set of SRIs; and a second number of UL PT-RS ports to be transmitted according to the SRS resources indicated in the second set of SRIs; and transmitting the determined number of UL PT-RS ports along with a plurality of PUSCH repetitions.

In some embodiments, a first subset of PUSCH repetitions among the plurality of PUSCH repetitions are transmitted according to the SRS resources indicated in the first set of SRIs and the first subset of PUSCH repetitions include transmission of the first number of UL PT-RS ports.

In some embodiments, a second subset of PUSCH repetitions among the plurality of PUSCH repetitions, disjoint from the first subset of PUSCH repetitions, are transmitted according to the SRS resources indicated in the second set of SRIs and the second subset of PUSCH repetitions include transmission of the second number of UL PT-RS ports.

In some embodiments, all of the PUSCH repetitions are transmitted according to the SRS resources indicated in the first set of SRIs and the PUSCH repetitions include transmission of the first number of UL PT-RS ports.

In some embodiments, all of the PUSCH repetitions are transmitted according to the SRS resources indicated in the second set of SRIs and the PUSCH repetitions include transmission of the second number of UL PT-RS ports.

In some embodiments, the first number of UL PT-RS ports is the same as the second number of uplink PT-RS ports. In some embodiments, the first number of UL PT-RS ports is different from the second number of UL PT-RS ports.

In some embodiments, the first number of UL PT-RS ports is determined to be one when the SRS resources indicated in the first set of SRIs all have the same PT-RS port index configured. In some embodiments, the second number of UL PT-RS ports is determined to be one when the SRS resources indicated in the second set of SRIs all have the same PT-RS port index configured.

In some embodiments, the first number of uplink PT-RS ports is determined to be two when the SRS resources indicated in the first set of SRIs have two different PT-RS port index values configured. In some embodiments, the second number of uplink PT-RS ports is determined to be two when the SRS resources indicated in the second set of SRIs have two different PT-RS port index values configured.

In some embodiments, the first set of SRIs and the second set of SRIs are respectively indicated via a first SRI field and a second SRI field in a Downlink Control Indicator, DCI, scheduling the PUSCH repetition. In some embodiments, the first set of SRIs and the second set of SRIs are respectively indicated via a first index and a second index configured as part of configured grant PUSCH configuration.

In some embodiments, the first SRS resource set corresponds to a first Transmit and Reception Point (TRP) and the second SRS resource set corresponds to a second TRP. In some embodiments, the wireless device operates in a Fifth Generation (5G) New Radio (NR) network.

Methods for determining the actual number of UL PT-RS ports for non-codebook based multi-TRP PUSCH transmission are proposed. In the proposed solution, the first number of UL PT-RS ports corresponding to the first TRP are determined according to the SRS resources indicated in a first set of SRIs from a first configured SRS resource set. The second number of UL PT-RS ports corresponding to the second TRP are determined according to the SRS resources indicated in a second set of SRIs from a second configured SRS resource set. In some embodiments, the UE transmits the same number of UL PT-RS ports to the two TRPs. In another embodiment, the number of UL PT-RS ports are determined independently for TRP1 and TRP2.

There are, proposed herein, various embodiments which address one or more of the issues disclosed herein. Certain embodiments may provide one or more of the following technical advantage(s). In Embodiment 1, the same number of UL PT-RS ports are transmitted towards the two TRPs which is beneficial if the same number of UE panels are used for PUSCH repetitions towards TRP 1 and TRP 2. If a single UE panel is used to transmit PUSCH layers towards both TRP 1 and TRP2, then a single UL PT-RS port is sufficient for PUSCH repetitions towards both TRP1 and TRP2. If two UE panels are used to transmit PUSCH layers towards both TRP 1 and TRP2, then two UL PT-RS ports are needed for PUSCH repetitions towards both TRP1 and TRP2.

Embodiment 2 is beneficial for UEs equipped with multiple antenna panels, where the UE uses N1 panels to transmit PUSCH towards a first TRP, and uses N2 panels to transmit PUSCH towards a second TRP, where N1 can be different from N2.

Embodiment 3 is beneficial for determining the number of UL PT-RS ports in case there is dynamic switching between single TRP based PUSCH and multi-TRP based PUSCH.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
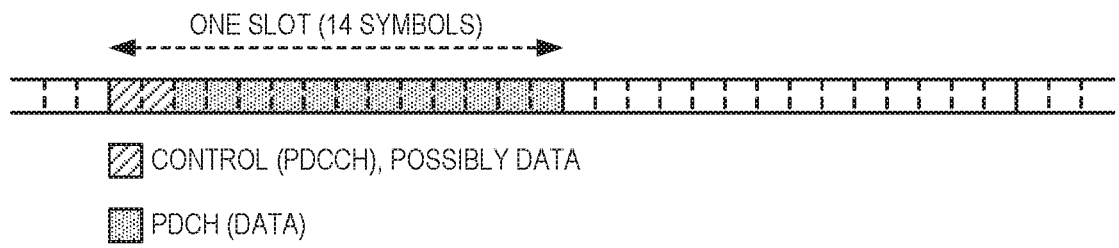
FIG. 1 illustrates that data scheduling in New Radio (NR) is typically in slot basis with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH)
Figure 2:
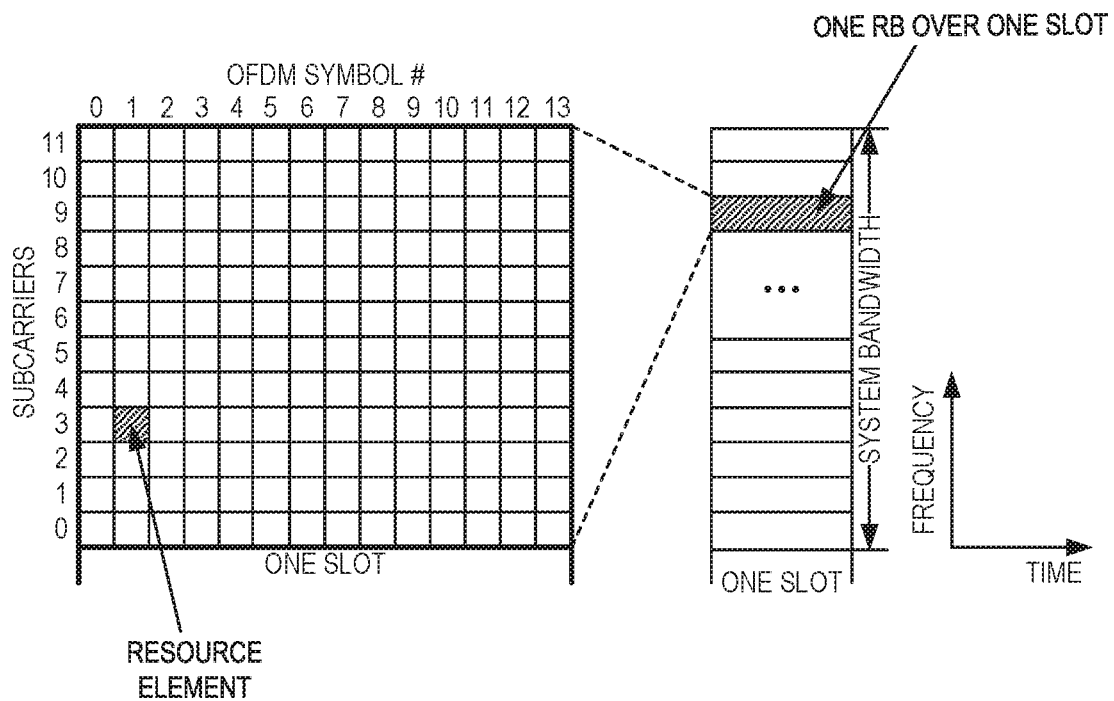
FIG. 2 illustrates the basic NR physical time-frequency resource grid where only one Resource Block (RB) within a 14-symbol slot is shown.
Figure 3:
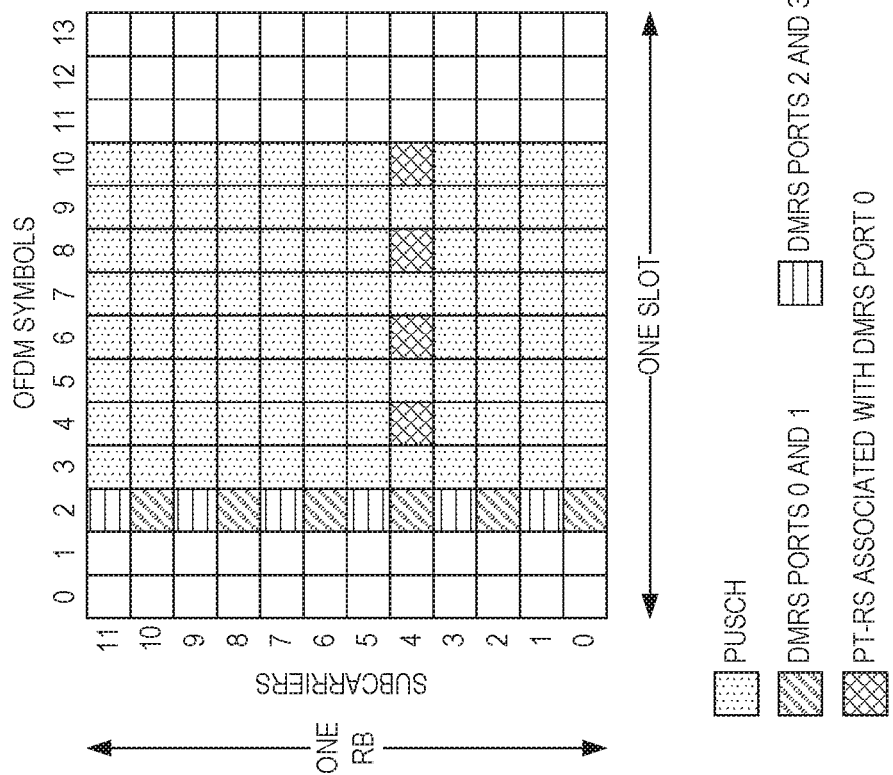
FIG. 3 illustrates a Phase-Tracking Reference Signals (PT-RS) example where the PT-RS port is associated with Demodulation Reference Signal (DM-RS) port 0 and has a subcarrier offset of 4 and a time density of 2.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

Figure 4:
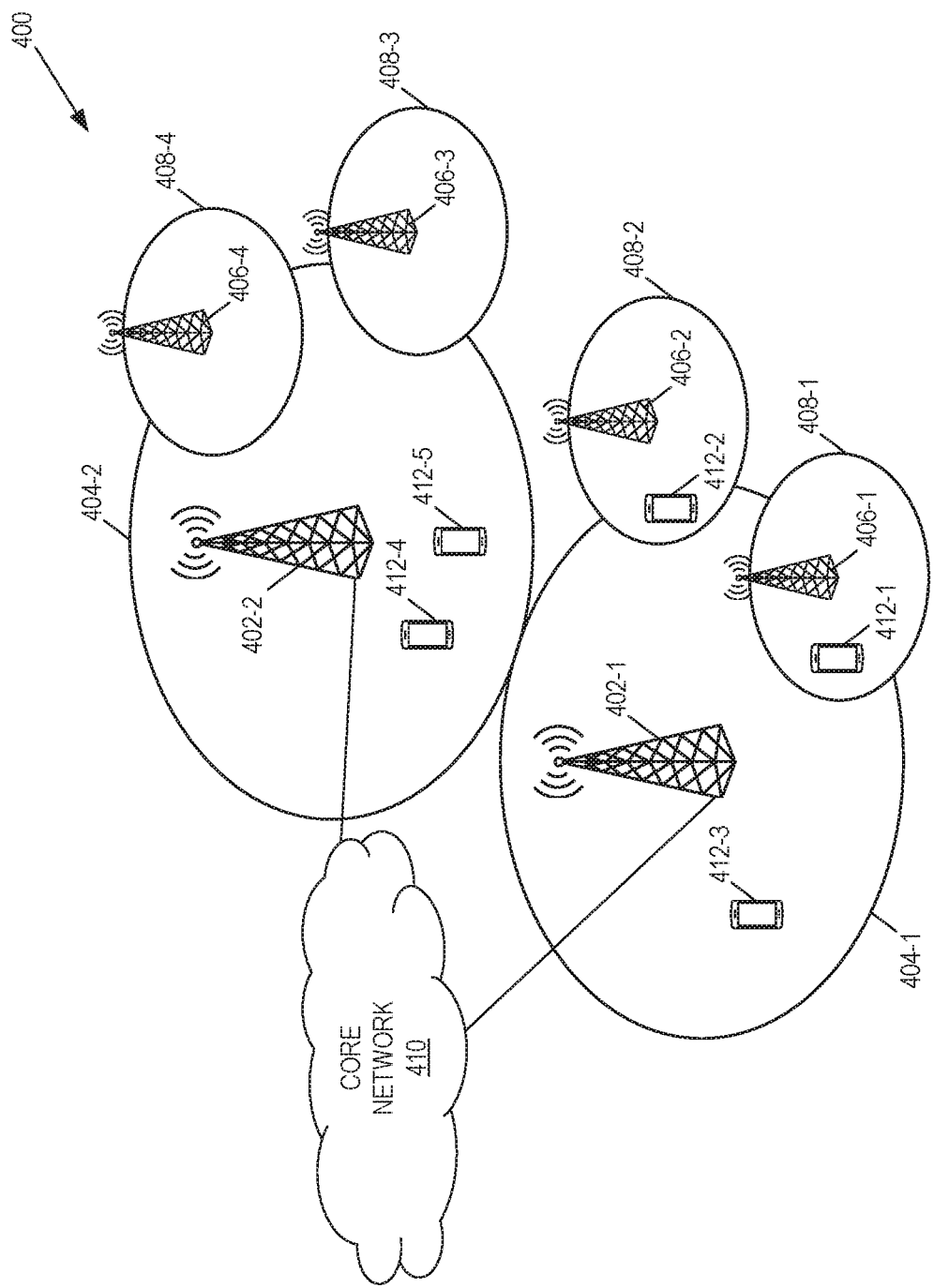
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC) or an Evolved Packet System (EPS) including an Evolved Universal Terrestrial RAN (E-UTRAN) and a Evolved Packet Core (EPC). In this example, the RAN includes base stations 402-1 and 402-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or RRHs, or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

To simplify the discussion, two TRPs are considered throughout this disclosure, but it is noted that the solution presented can be easily extended to more than two TRPs.

It is assumed that a UE is configured with two SRS resource sets with "usage" set to "non-codebook", where each of the SRS resource sets is associated with a TRP.

Note that the term 'TRP' may not be part of 3GPP standard specifications. Instead, "SRS resource set", SRI field (where one SRI field in DCI corresponds to a TRP), or "TCI state", may be used, as part of the standard, which are then equivalent to indicating a certain TRP.

Figure 5:
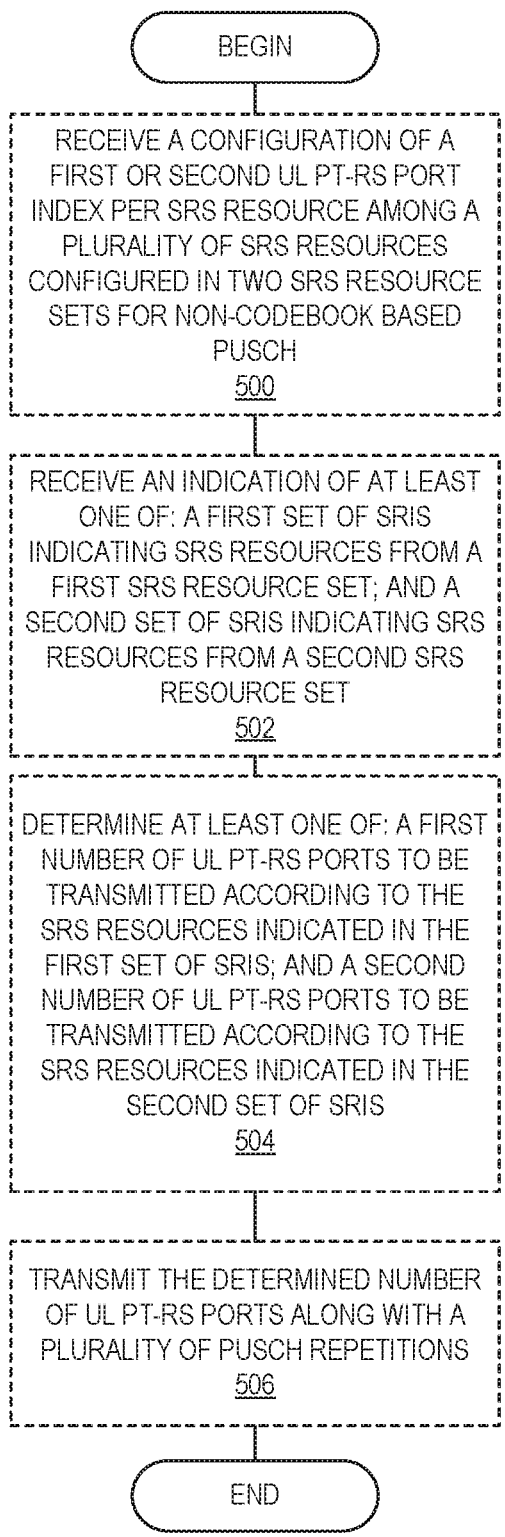
FIG. 5 illustrates a method performed by a wireless device for non-codebook based PUSCH transmission, according to some embodiments of the present disclosure.

FIG. 5 illustrates a method performed by a wireless device for non-codebook based Physical Uplink Shared Channel (PUSCH) transmission, according to some embodiments of the present disclosure. The method includes one or more of: receiving a configuration of a first or second Uplink (UL) Phase-Tracking Reference Signals (PT-RS) port index per Sounding Reference Signal (SRS) resource among a plurality of SRS resources configured in two SRS resource sets for non-codebook based PUSCH (step 500); receiving an indication of at least one of: a first set of SRS Resource Indicators (SRIs) indicating SRS resources from a first SRS resource set; and a second set of SRIs indicating SRS resources from a second SRS resource set (step 502); determining at least one of: a first number of UL PT-RS ports to be transmitted according to the SRS resources indicated in the first set of SRIs; and a second number of UL PT-RS ports to be transmitted according to the SRS resources indicated in the second set of SRIs (step 504); and transmitting the determined number of UL PT-RS ports along with a plurality of PUSCH repetitions (step 506).

Figure 6:
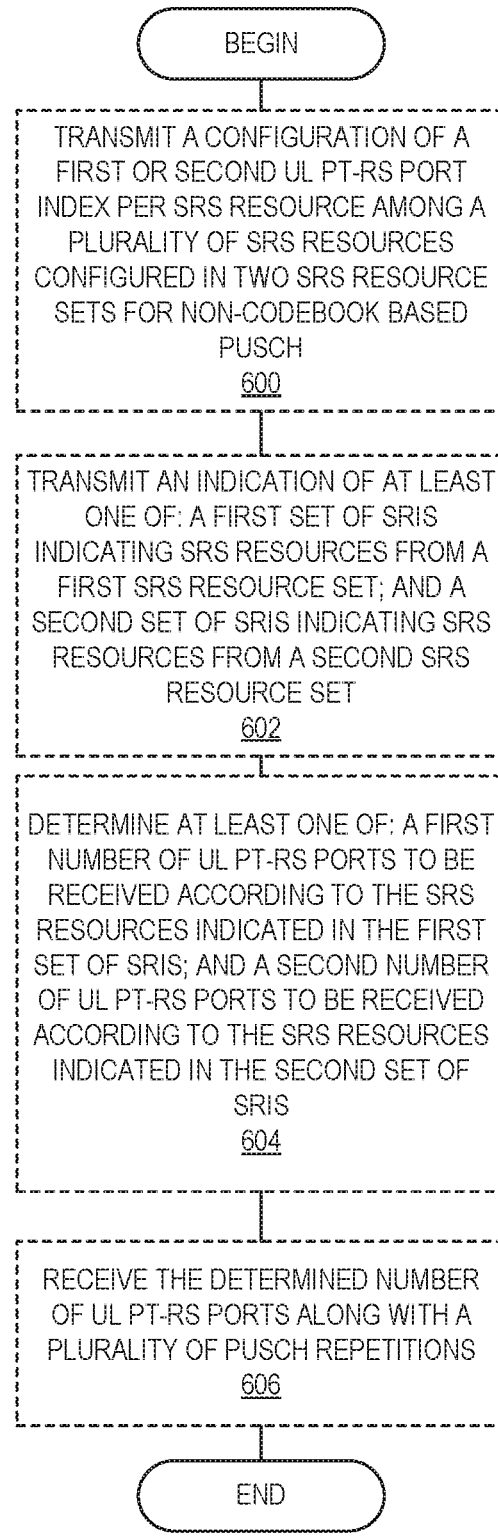
FIG. 6 illustrates a method performed by a base station for non-codebook based PUSCH reception, according to some embodiments of the present disclosure.

FIG. 6 illustrates a method performed by a base station for non-codebook based PUSCH reception, according to some embodiments of the present disclosure. The method includes one or more of: transmitting configuration of a first or second UL PT-RS port index per SRS resource among a plurality of SRS resources configured in two SRS resource sets (step 600); transmitting an indication of at least one of: a first set of SRIs indicating SRS resources from a first SRS resource set; and a second set of SRIs indicating SRS resources from a second SRS resource set (step 602); determining at least one of: a first number of UL PT-RS ports to be received according to the SRS resources indicated in the first set of SRIs; and a second number of UL PT-RS ports to be received according to the SRS resources indicated in the second set of SRIs (step 604); and receiving the determined number of UL PT-RS ports along with a plurality of PUSCH repetitions (step 606).

In some embodiments, two SRI fields in an UL DCI (e.g., a DCI that is scheduled with DCI Format 0_1 or DCI Format 0_2) are used to indicate 2 sets of SRIs, one for each TRP, for PUSCH transmission to the two TRPs. The SRIs indicated in the first SRI field correspond to SRS resource(s) in the first SRS resource set, and the SRIs indicated in the second SRI field correspond to SRS resource(s) in the second SRS resource set.

In some other embodiments, in case of configured grant PUSCH transmissions, two indicators indicating two sets of SRIs may be configured to the UE as part of the ConfiguredGrantConfig information element in RRC configuration. For example, the first srs-ResourceIndicator in ConfiguredGrantConfig corresponds to the SRS resource(s) in the first SRS resource set, and the second srs-ResourceIndicator in ConfiguredGrantConfig corresponds to the SRS resource(s) in the second SRS resource set.

In one embodiment, a same number of PTRS ports may be configured for PUSCH transmissions to single TRP and to multiple TRPs. In another embodiment, the number of PTRS ports may be configured separately for PUSCH transmissions to a single TRP and PUSCH transmissions to multiple TRPs.

Figure 7:
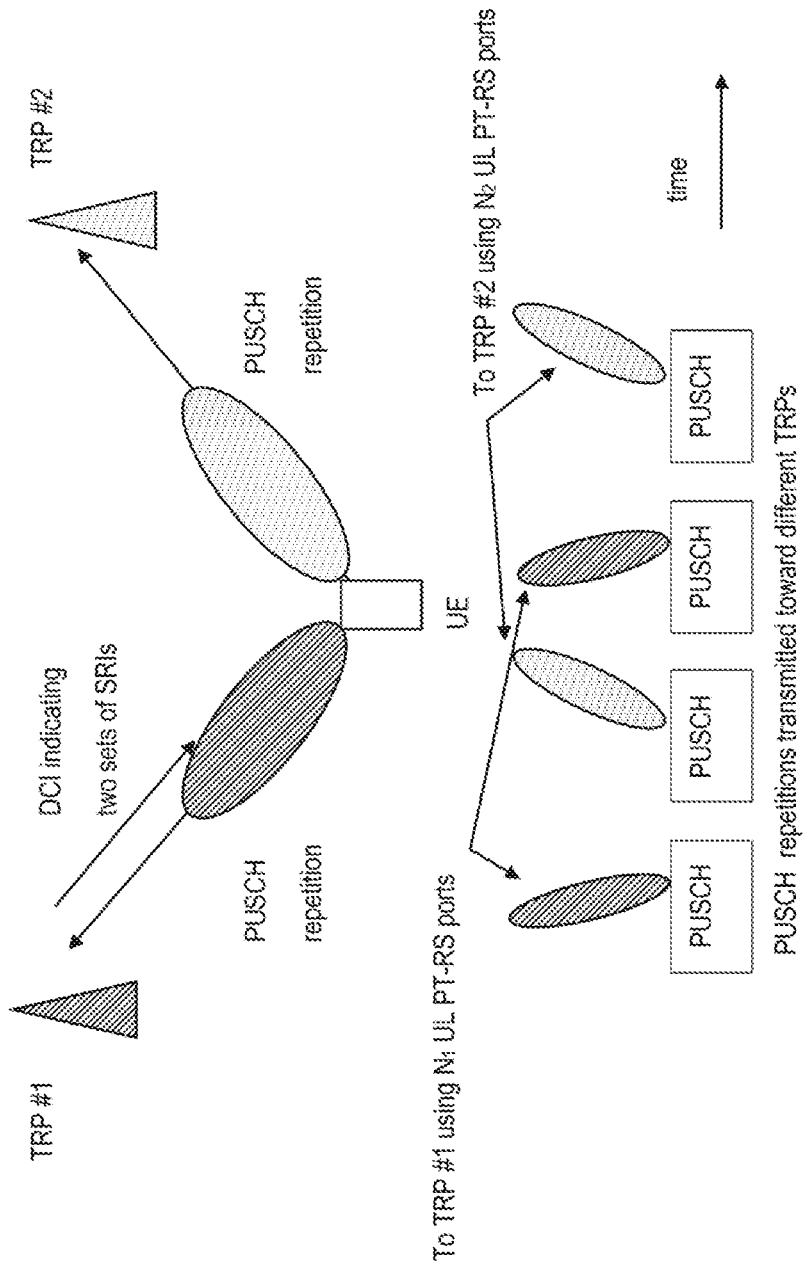
FIG. 7 shows an illustration of PUSCH repetition towards two TRPs where some of the PUSCH repetitions are targeted towards TRP1 and the other PUSCH repetitions are targeted towards TRP2, according to some embodiments of the present disclosure.

FIG. 7 shows an illustration of PUSCH repetition towards two TRPs where some of the PUSCH repetitions are targeted towards TRP1 and the other PUSCH repetitions are targeted towards TRP2. The number of PUSCH layers and the number of UL PT-RS ports N1 that are transmitted towards TRP1 are determined using the first set of SRIs that are indicated (e.g., using a first SRI field) which correspond to the SRS resources indicated from the first SRS resource set with "usage" set to 'non-codebook'. The number of PUSCH layers and the number of UL PT-RS ports N2 that are transmitted towards TRP2 are determined using the second set of SRIs that are indicated (e.g., using a second SRI field) which correspond to the SRS resources indicated from the second SRS resource set with "usage" set to 'non-codebook'. How the number of UL PT-RS ports N1 and N2 are determined is covered by the different embodiments given below. FIG. 7 illustrates an illustration of PUSCH repetition towards two TRPs with N1 and N2 UL PT-RS ports targeting TRPs 1 and 2, respectively.

Embodiment 1: Same Number of UL PT-RS Ports Towards Different TRPs

Provide block diagram(s) illustrating the system/structure/node level architecture/platforms and describe your solution in detail with reference to the figure(s). Indicate new structures/blocks by way of a graphical emphasis or other indications in the text and figures.

In one embodiment, the number of UL PT-RS ports corresponding to the PUSCH repetitions transmitted towards TRP 1 are first determined based on the first set of SRIs indicated from the first SRS resource set with "usage" set to 'non-codebook'.

When the SRS resources indicated in the first set of SRIs from the first SRS resource set all have the same PT-RS port index configured (e.g., either n0 or n1), then a single UL PT-RS port N1=1 is determined for transmission towards TRP1.

When the SRS resources indicated in the first set of SRIs from the first SRS resource set have different PT-RS port indices configured (e.g., some indicated SRS resources having PT-RS port index n0 while other indicated SRS resources having PT-RS port index n1), then two UL PT-RS ports $N_1=2$ are determined for transmission towards TRP1.

Once the number of UL PT-RS ports N1 for transmission towards TRP1 is determined as above, then the same number of UL PT-RS ports N2 (i.e., N2=N1) are used for transmission of PUSCH repetitions towards TRP2. This means that the SRS resources indicated in the second set of SRIs from the second SRS resource set with "usage" set to 'non-codebook' need to have the same number of UL PT-RS ports as N1. This embodiment may be captured in 3GPP specifications as a rule where the UE expects the number of UL PT-RS ports associated with the PUSCH repetitions corresponding to the first SRS resource set (e.g., the first TRP) to be the same as the number of UL PT-RS ports associated with the PUSCH repetitions corresponding to the second SRS resource set (e.g., the second TRP).

Note that using the same number of UL PT-RS ports towards the two TRPs is beneficial if the same number of UE panels are used for PUSCH repetitions towards TRP 1 and TRP 2. If a single UE panel is used to transmit PUSCH layers towards both TRP 1 and TRP2, then a single UL PT-RS port is sufficient for PUSCH repetitions towards both TRP1 and TRP2 (i.e., N1=N2=1). If two UE panels are used to transmit PUSCH layers towards both TRP 1 and TRP2, then two UL PT-RS ports are needed for PUSCH repetitions towards both TRP1 and TRP2 (i.e., N1=N2=2).

Figure 8:
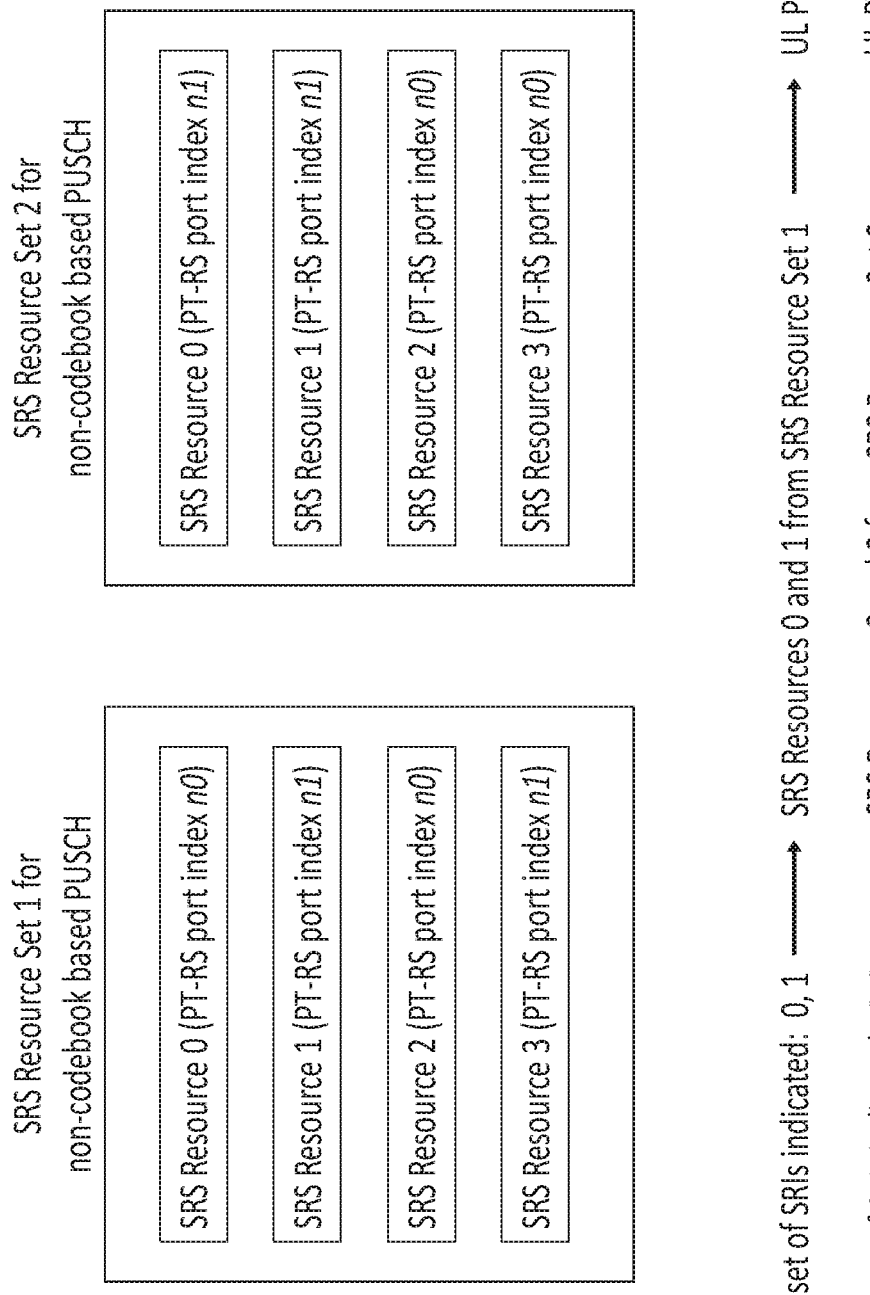
FIGS. 8 and 9 illustrate two Uplink (UL) PT-RS ports corresponding to the PUSCH repetitions towards both TRP1 and TRP2, according to some embodiments of the present disclosure.

A first example illustrating two UL PT-RS ports corresponding to the PUSCH repetitions towards both TRP1 and TRP2 is shown in FIG. 8, according to some embodiments of the present disclosure. In this example, the first set of SRIs indicates to the UE that for PUSCH repetitions towards TRP1, two PUSCH layers are to be transmitted using the same antenna ports as the SRS port(s) in resources 0 and 1 from SRS resource set 1. Since these two resources have UL PT-RS ports n0 and n1 configured, the number of UL PT-RS ports to be transmitted towards TRP1 is determined as two (i.e., N1=2). Then, the second set of SRIs indicates two SRS resources (0 and 2) from the second SRS resource set such that the number of configured UL PT-RS ports in these two resources is also 2 (i.e., N2=N1=2). As shown in the FIG. 8, the two SRS resources indicated by the 2nd set of SRIs have UL PT-RS ports n0 and n1 configured, and hence, UL PT-RS ports n0 and n1 will be transmitted towards TRP2.

Figure 9:
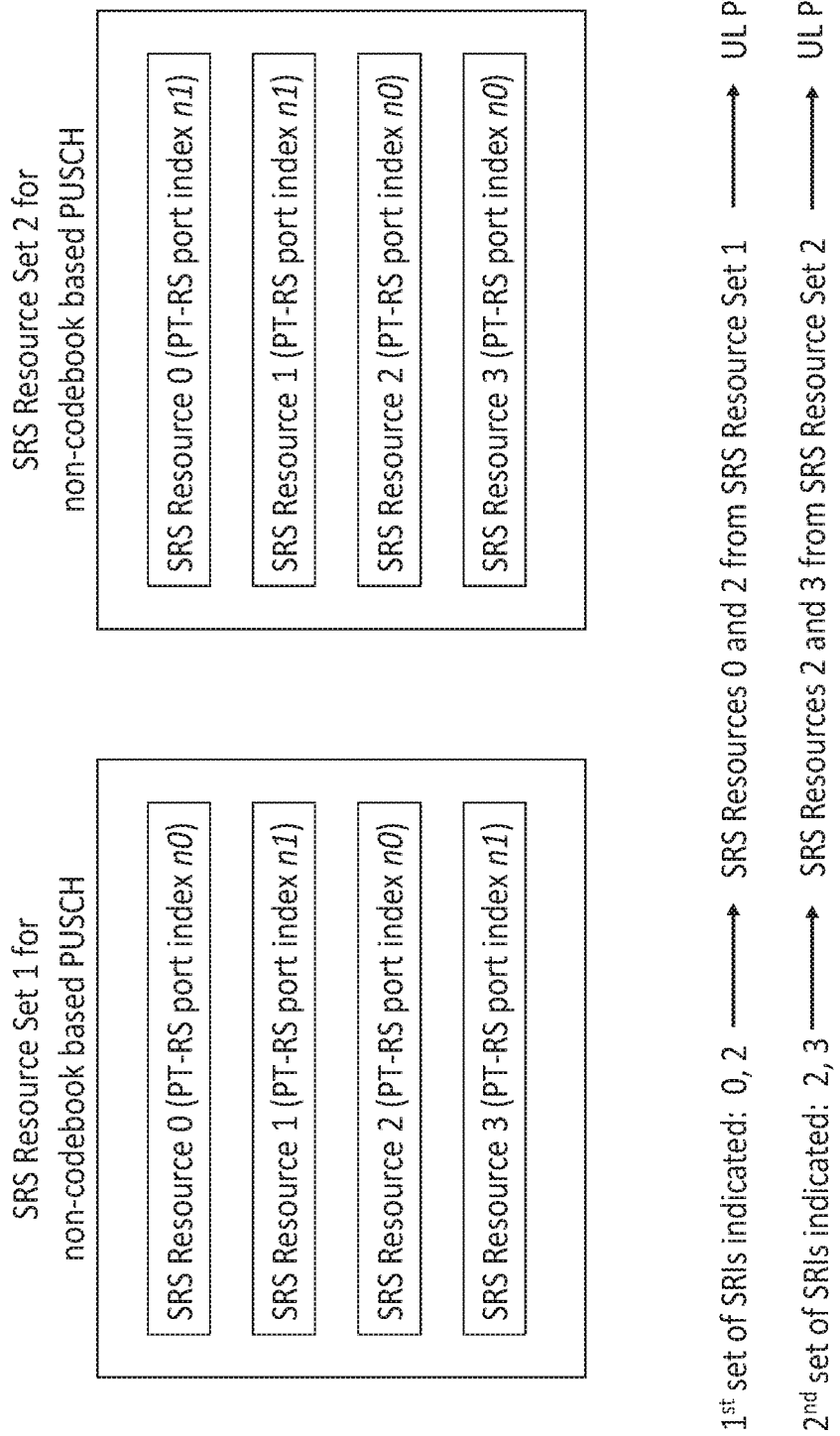

A second example illustrating two UL PT-RS ports corresponding to the PUSCH repetitions towards both TRP1 and TRP2 is shown in FIG. 9, according to some embodiments of the present disclosure. In this example, the first set of SRIs indicates to the UE that for PUSCH repetitions towards TRP1, two PUSCH layers are to be transmitted using the same antenna ports as the SRS port(s) in resources 0 and 2 from SRS resource set 1. Since these two resources have only UL PT-RS port n0 configured, the number of UL PT-RS ports to be transmitted towards TRP1 is determined to be one (i.e., N1=1). Then, the second set of SRIs indicates two SRS resources (0 and 2) from the second SRS resource set such that the number of configured UL PT-RS ports in these two resources is also 1 (i.e., N2=N1=2). As shown in the FIG. 9, the two SRS resources indicated by the 2nd set of SRIs have UL PT-RS port n0 configured, and hence, UL PT-RS port n0 will be transmitted towards TRP2.

Figure 10:
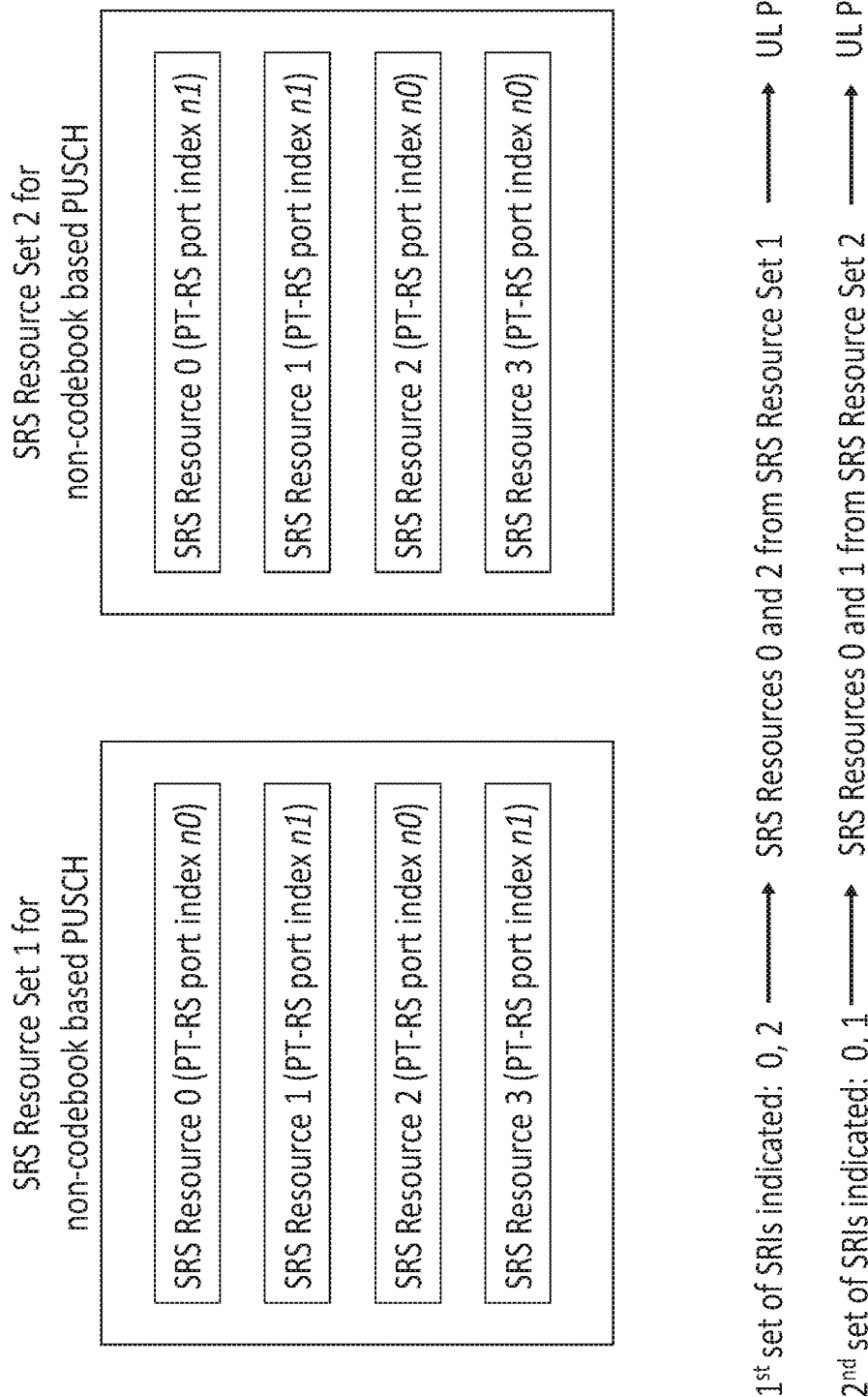
FIG. 10 illustrates that even though the number of UL PT-RS ports transmitted towards TRP1 and TRP2 are the same, the exact UL PT-RS port indices transmitted towards TRP1 and TRP 2 may be different, according to some embodiments of the present disclosure.

It should be noted in this embodiment, that even though the number of UL PT-RS ports transmitted towards TRP1 and TRP2 are the same, the exact UL PT-RS port indices transmitted towards TRP1 and TRP 2 may be different. Such an example is illustrated in FIG. 10. In this example, the two SRS resources indicated by the 1st set of SRIs have UL PT-RS port n0 configured. Hence, UL PT-RS port n0 will be transmitted towards TRP1. However, the two SRS resources indicated by the 2nd set of SRIs have PT-RS port n1 configured, and hence, UL PT-RS port n1 will be transmitted towards TRP2.

In this example, the first set of SRIs indicates to the UE that for PUSCH repetitions towards TRP1, two PUSCH layers are to be transmitted using the same antenna ports as the SRS port(s) in resources 0 and 2 from SRS resource set 1. Since these two resources have only UL PT-RS port n0 configured, the number of UL PT-RS ports to be transmitted towards TRP1 is determined to be one (i.e., N1=1). Then, the second set of SRIs indicates two SRS resources (0 and 2) from the second SRS resource set such that the number of configured UL PT-RS ports in these two resources is also 1 (i.e., N2=N1=2). As shown in the FIG. 9, the two SRS resources indicated by the 2nd set of SRIs have UL PT-RS port n0 configured, and hence, UL PT-RS port n0 will be transmitted towards TRP2.

Figure 11:
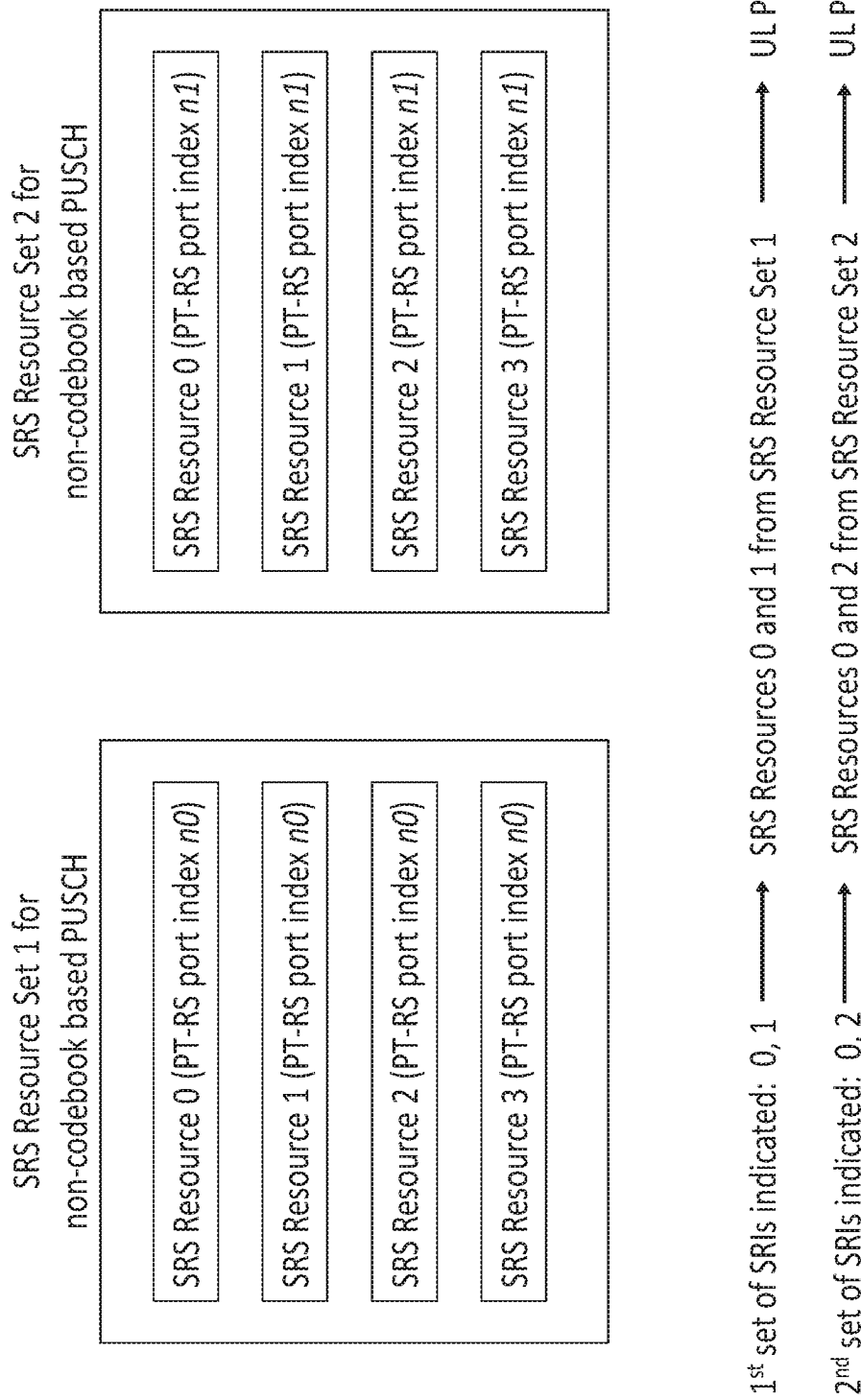
FIG. 11 illustrates an option to configure the same UL PT-RS port index in all Sounding Reference Signal (SRS) resources of a SRS resource set, according to some embodiments of the present disclosure.

In another embodiment, when PUSCH repetitions towards two TRPs are scheduled by the network (i.e., via configuration of two SRS resource sets with usage set to 'nonCodebook' and indication of two sets of SRIs), only a single UL PT-RS port (e.g., UL PT-RS port with index n0) is allowed to be transmitted towards both TRP1 and TRP2. This is beneficial for the case when a UE transmits to one TRP using only a single panel in which case it is sufficient for the UE to transmit a single UL PT-RS port over which phase tracking can be performed. One option is to configure the same UL PT-RS port index in all SRS resources of a SRS resource set as shown in FIG. 11. As shown in the figure, UL PT-RS port index n0 is configured in all SRS resources of SRS resource set 1, while UL PT-RS port index n1 is configured in all SRS resources of SRS resource set 2. In this example, UL PT-RS port index n0 will be transmitted towards TRP1 and UL PT-RS port index n1 will be transmitted towards TRP2.

In an alternative embodiment, only UL PT-RS port index n0 can be associated with all the SRS resources configured in the two SRS resource sets. That is, UL PT-RS port index n0 is associated in all SRS resources of SRS resource set 1, and UL PT-RS port index n0 is associated in all SRS resources of SRS resource set 2. In this case, explicit configuration of UL PT-RS port index n0 per SRS resource is not needed. Hence, in this alternative embodiment, when PUSCH repetitions towards two TRPs are scheduled by the network (i.e., via configuration of two SRS resource sets with usage set to 'nonCodebook' and indication of two sets of SRIs), the UL PT-RS port index is not explicitly configured per SRS resource and the UE uses UL PT-RS port index n0 towards TRP1 and TRP2. This alternative embodiment can save some configuration overhead as an RRC parameter configuring the PT-RS port index per SRS resource is no longer needed.

Figure 12:
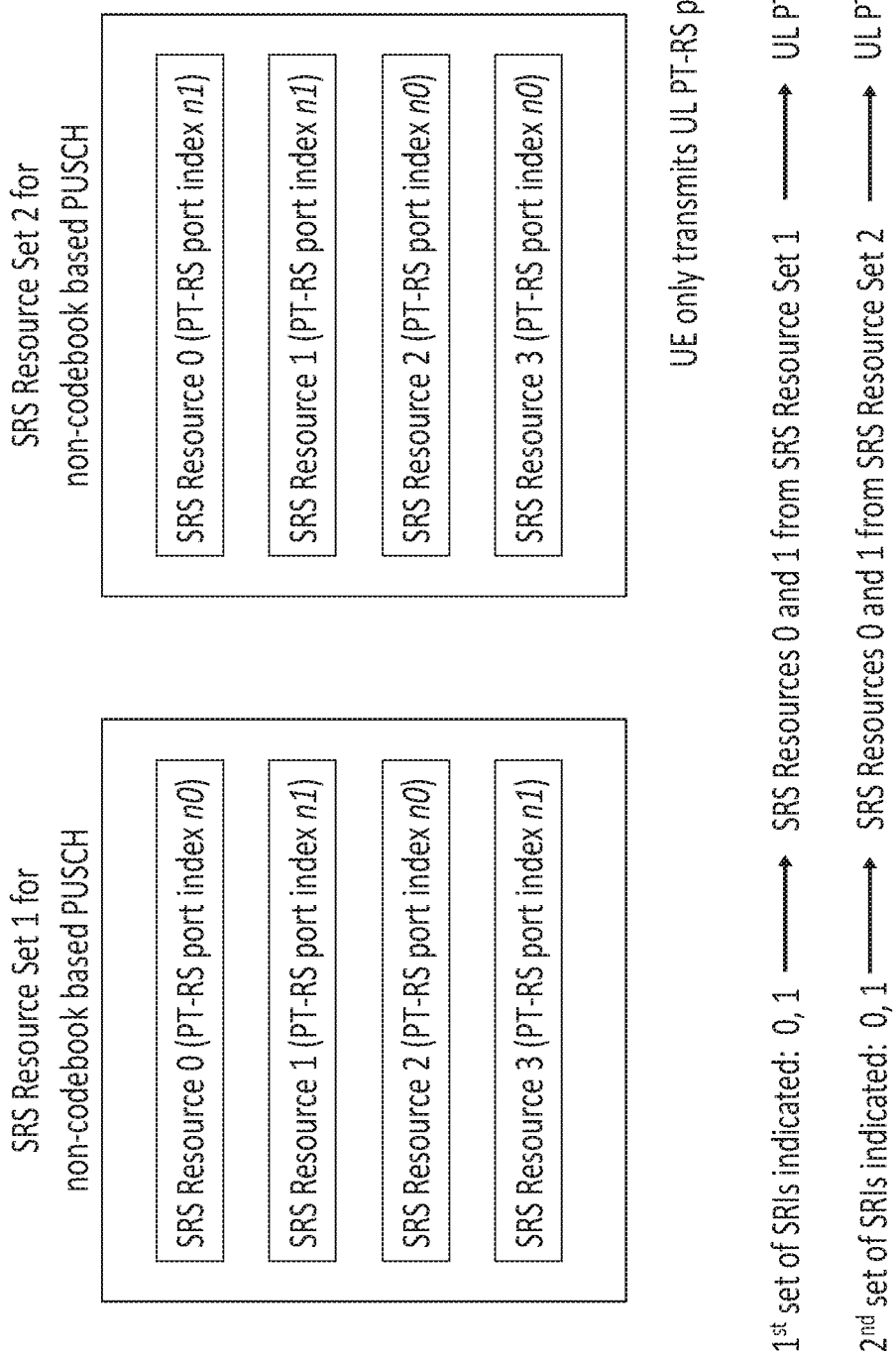
FIG. 12 illustrates an example where the UE first determines, based on the configured SRS resource sets and the indicated first and second set of SRS Resource Indicators (SRIs), that the UL PT-RS ports associated with the 1st set of SRIs indicated are n0 and n1, and the UL PT-RS ports associated with the 2 nd set of SRIs indicated are n0, according to some embodiments of the present disclosure.

In yet another embodiment, the UE determines the number of UL PT-RS ports for the two TRPs independently, and only transmits the smaller of number of the two determined number of UL PT-RS ports. For instance, consider the example in FIG. 12, where the UE first determines based on the configured SRS resource sets and the indicated first and second set of SRIs that the UL PT-RS ports associated with the 1st set of SRIs indicated are n0 and n1, and the UL PT-RS ports associated with the 2 nd set of SRIs indicated are n0. However, according to this embodiment, to ensure the same number of UL PT-RS ports are transmitted towards TRP1 and TRP2, the UE drops n1 and only transmits UL PT-RS port n0 for PUSCH transmission(s) associated with the 1st set of SRIs indicated. That is, the UE transmit UL PT-RS port n0 for transmissions towards both TRP1 and TRP2.

Embodiment 2: Independent Determination of Number of UL PT-RS Ports Towards Different TRPs In this embodiment, the number of UL PT-RS ports corresponding to the PUSCH repetitions transmitted towards TRP 1 are first determined based on the first set of SRIs indicated from the first SRS resource set with "usage" set to 'non-codebook'.

When the SRS resources indicated in the first set of SRIs from the first SRS resource set all have the same PT-RS port index configured (e.g., either n0 or n1), then a single UL PT-RS port $N_1=1$ is determined for transmission towards TRP1.

When the SRS resources indicated in the first set of SRIs from the first SRS resource set have different PT-RS port indices configured (e.g., some indicated SRS resources having PT-RS port index n0 while other indicated SRS resources having PT-RS port index n1), then two UL PT-RS ports $N_1=2$ are determined for transmission towards TRP1.

Once the number of UL PT-RS ports N1 for transmission towards TRP1 is determined as above, then the number of UL PT-RS ports N2 for transmission of PUSCH repetitions towards TRP2 is determined based on the second set of SRIs indicated from the second SRS resource set with "usage" set to 'non-codebook'.

When the SRS resources indicated in the second set of SRIs from the second SRS resource set all have the same PT-RS port index configured (e.g., either n0 or n1), then a single UL PT-RS port $N_2=1$ is determined for transmission towards TRP2.

When the SRS resources indicated in the second set of SRIs from the second SRS resource set have different PT-RS port indices configured (e.g., some indicated SRS resources having PT-RS port index n0 while other indicated SRS resources having PT-RS port index n1), then two UL PT-RS ports $N_2=2$ are determined for transmission towards TRP2.

Note that in this embodiment, the number of UL PT-RS ports $N_1$ (corresponding to TRP1) and $N_2$ (corresponding to TRP2) are independently determined based on the indicated first set of SRIs and the indicated second set of SRIs, respectively. In some cases, the number of UL PT-RS ports $N_1$ determined based on the indicated first set of SRIs may be different from the number of UL PT-RS ports $N_2$ determined based on the indicated second set of SRIs. This embodiment is beneficial for UEs equipped with multiple antenna panels, where the UE uses $N_1$ panels to transmit PUSCH towards a first TRP, and uses $N_2$ panels to transmit PUSCH towards a second TRP, where $N_1$ can be different from $N_2$.

Figure 13:
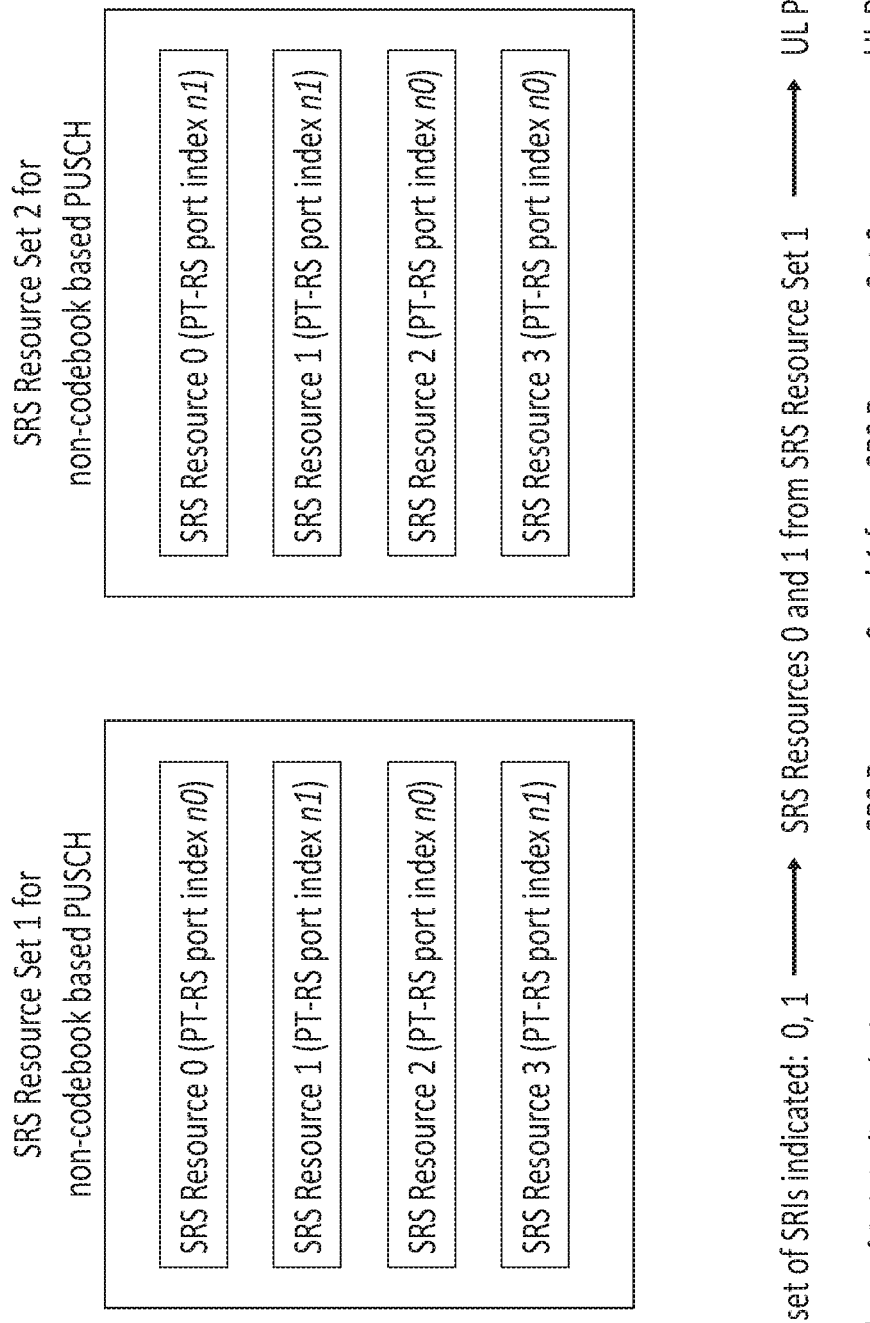
FIG. 13 illustrates an example where the first set of SRIs indicates to the UE that for PUSCH repetitions towards TRP1, two PUSCH layers are to be transmitted using the same antenna ports as the SRS port(s) in resources 0 and 1 from SRS resource set 1, according to some embodiments of the present disclosure.

Consider the example in FIG. 13. In this example, the first set of SRIs indicates to the UE that for PUSCH repetitions towards TRP1, two PUSCH layers are to be transmitted using the same antenna ports as the SRS port(s) in resources 0 and 1 from SRS resource set 1. Since these two resources have UL PT-RS ports n0 and n1 configured, the number of UL PT-RS ports to be transmitted towards TRP1 is determined to be two (i.e., $N_1=2$). The second set of SRIs indicates two SRS resources (0 and 1) from the second SRS resource set where both these SRS resources are configured with UL PT-RS port n0. Hence, the number of UL PT-RS ports to be transmitted towards TRP2 is determined to be one (i.e., $N_2=1$). After determining the number of UL PT-RS ports $N_1$ and $N_2$, the UE transmits some of PUSCH repetitions towards TRP1 with $N_1$ UL PT-RS ports and other PUSCH repetitions towards TRP2 with $N_2$ UL PT-RS ports.

Embodiment 3: Determination of Number of UL PT-RS Ports when Dynamically Switching Between Single TRP PUSCH Repetition and Multi-TRP PUSCH Repetition In this embodiment, the UE may be indicated with two SRI fields in DCI where in only one of the SRI fields in DCI is enabled when scheduling a PUSCH repetition transmission while the second SRI field in DCI is disabled. This case corresponds to PUSCH repetition towards a single TRP. That is, PUSCH repetition is transmitted using the SRS resources from one SRS resource set that corresponds to the enabled SRI field. It should be noted that in this case, the UE is still configured with two SRS resource sets with "usage" set to 'non-codebook' with two SRI fields in DCI corresponding to the two SRS resource sets. This setup can be used for dynamically switching between single TRP PUSCH transmission and multi-TRP PUSCH transmission.

To schedule PUSCH repetition towards TRP1 only, SRS resources from the first SRS resource set can be indicated to the UE via the first SRI field in DCI. The second SRI field is disabled (for instance, the second SRI field may not indicate any SRS resources and may point to a reserved codepoint). The UE determines the number of UL PT-RS ports $N_1$ from the set of SRIs indicated by the first SRI field in DCI. Then, the UE transmits all PUSCH repetitions along with $N_1$ UL PT-RS ports towards TRP1. If the indicated SRS resources are associated with a same UL PT-RS port, then a single UL PT-RS port would be transmitted (i.e., $N_1=1$). Otherwise, if the indicated SRS resources are associated with two UL PT-RS ports, then two UL PT-RS ports would be transmitted (i.e., $N_1=2$).

To schedule PUSCH repetition towards TRP2 only, SRS resources from the second SRS resource set can be indicated to the UE via the second SRI field in DCI. The first SRI field is disabled (for instance, the first SRI field may not indicate any SRS resources and may point to a reserved codepoint). The UE determines the number of UL PT-RS ports $N_2$ from the set of SRIs indicated by the second SRI field in DCI. Then, the UE transmits all PUSCH repetitions along with $N_2$ UL PT-RS ports towards TRP2. If the indicated SRS resources are associated with a same UL PT-RS port, then a single UL PT-RS port would be transmitted (i.e., $N_2=1$). Otherwise, if the indicated SRS resources are associated with two UL PT-RS ports, then two UL PT-RS ports would be transmitted (i.e., $N_2=2$).

Scheduling of PUSCH repetition towards both TRP1 and TRP2 is achieved according to the embodiments described in Embodiment 1 and 2.

Figure 14:
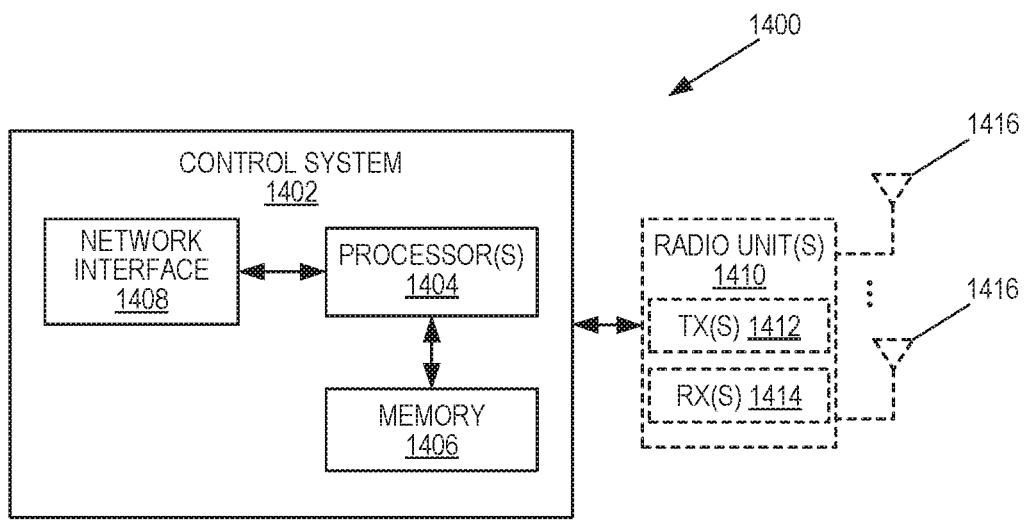
FIG. 14 is a schematic block diagram of a radio access node, according to some embodiments of the present disclosure.

FIG. 14 is a schematic block diagram of a radio access node 1400 according to some embodiments of the present disclosure. Optional features are represented by dashed boxes. The radio access node 1400 may be, for example, a base station 402 or 406 or a network node that implements all or part of the functionality of the base station 402 or gNB described herein. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. The one or more processors 1404 are also referred to herein as processing circuitry. In addition, the radio access node 1400 may include one or more radio units 1410 that each includes one or more transmitters 1412 and one or more receivers 1414 coupled to one or more antennas 1416. The radio units 1410 may be referred to or be part of radio interface circuitry. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of a radio access node 1400 as described herein. In some embodiments, the function(s) are implemented in software that is stored, e.g., in the memory 1406 and executed by the one or more processors 1404.

Figure 15:
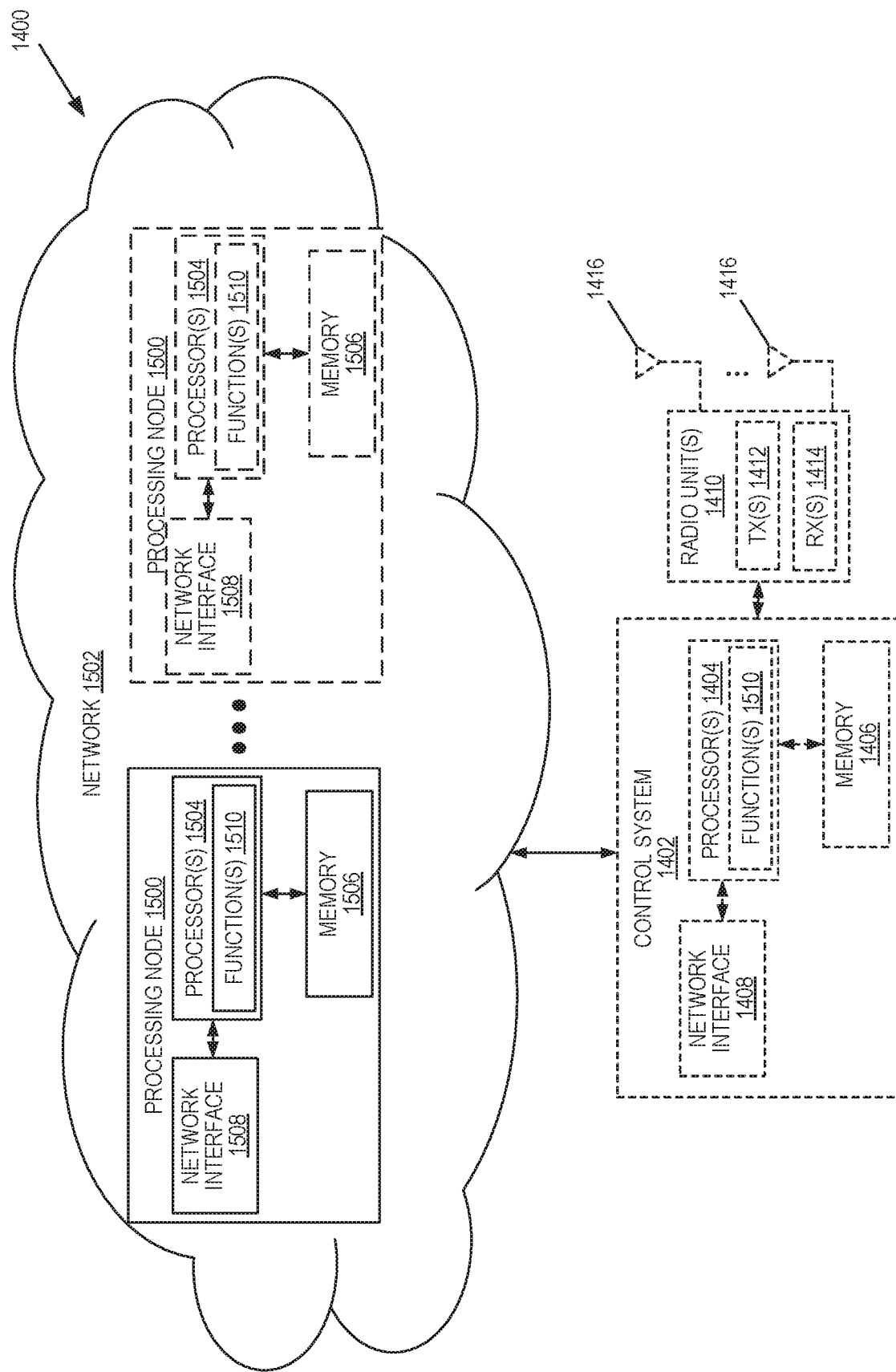
FIG. 15 is a schematic block diagram that illustrates a virtualized embodiment of the radio access node according to some embodiments of the present disclosure.

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node(s) in a network(s)). As illustrated, in this example, the radio access node 1400 may include the control system 1402 and/or the one or more radio units 1410, as described above. The control system 1402 may be connected to the radio unit(s) 1410 via, for example, an optical cable or the like. The radio access node 1400 includes one or more processing nodes 1500 coupled to or included as part of a network(s) 1502. If present, the control system 1402 or the radio unit(s) are connected to the processing node(s) 1500 via the network 1502. Each processing node 1500 includes one or more processors 1504 (e.g., CPUs, ASICs, FPGAs, and/or the like), memory 1506, and a network interface 1508.

In this example, functions 1510 of the radio access node 1400 described herein are implemented at the one or more processing nodes 1500 or distributed across the one or more processing nodes 1500 and the control system 1402 and/or the radio unit(s) 1410 in any desired manner. In some particular embodiments, some or all of the functions 1510 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
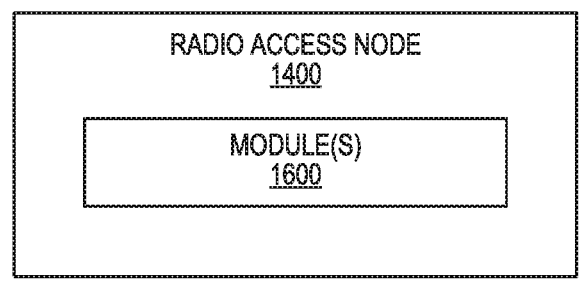
FIG. 16 is a schematic block diagram of the radio access node according to some other embodiments of the present disclosure.

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein. This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
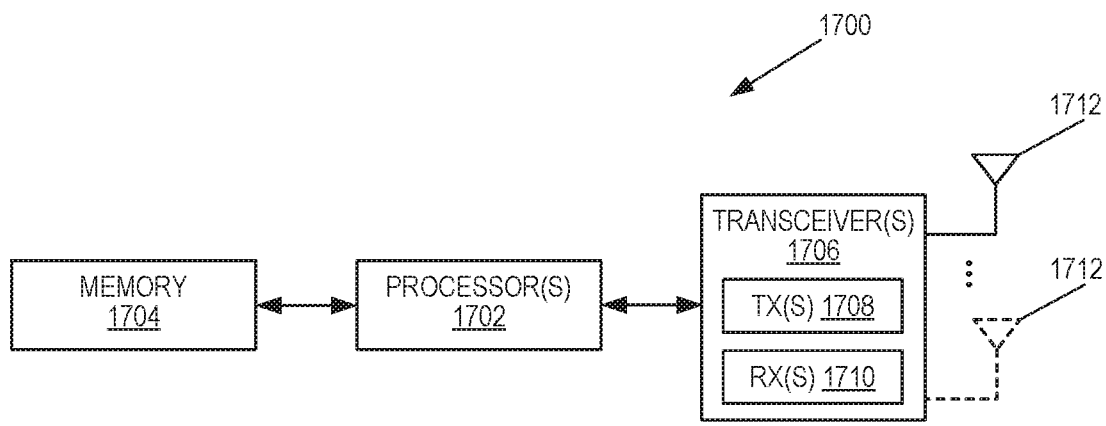
FIG. 17 is a schematic block diagram of a wireless communication device according to some other embodiments of the present disclosure.

FIG. 17 is a schematic block diagram of a wireless communication device 1700 according to some embodiments of the present disclosure. As illustrated, the wireless communication device 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the wireless communication device 1700 described above may be fully or partially implemented in software that is, e.g., stored in the memory 1704 and executed by the processor(s) 1702. Note that the wireless communication device 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the wireless communication device 1700 and/or allowing output of information from the wireless communication device 1700), a power supply (e.g., a battery and associated power circuitry), etc.

In some embodiments, a computer program including instructions which, when executed by at least one processor, causes the at least one processor to carry out the functionality of the wireless communication device 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
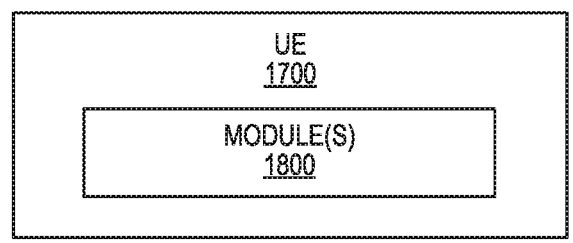
FIG. 18 is a schematic block diagram of the wireless communication device according to some other embodiments of the present disclosure.

FIG. 18 is a schematic block diagram of the wireless communication device 1700 according to some other embodiments of the present disclosure. The wireless communication device 1700 includes one or more modules 1800, each of which is implemented in software. The module(s) 1800 provide the functionality of the wireless communication device 1700 described herein.

Figure 19:
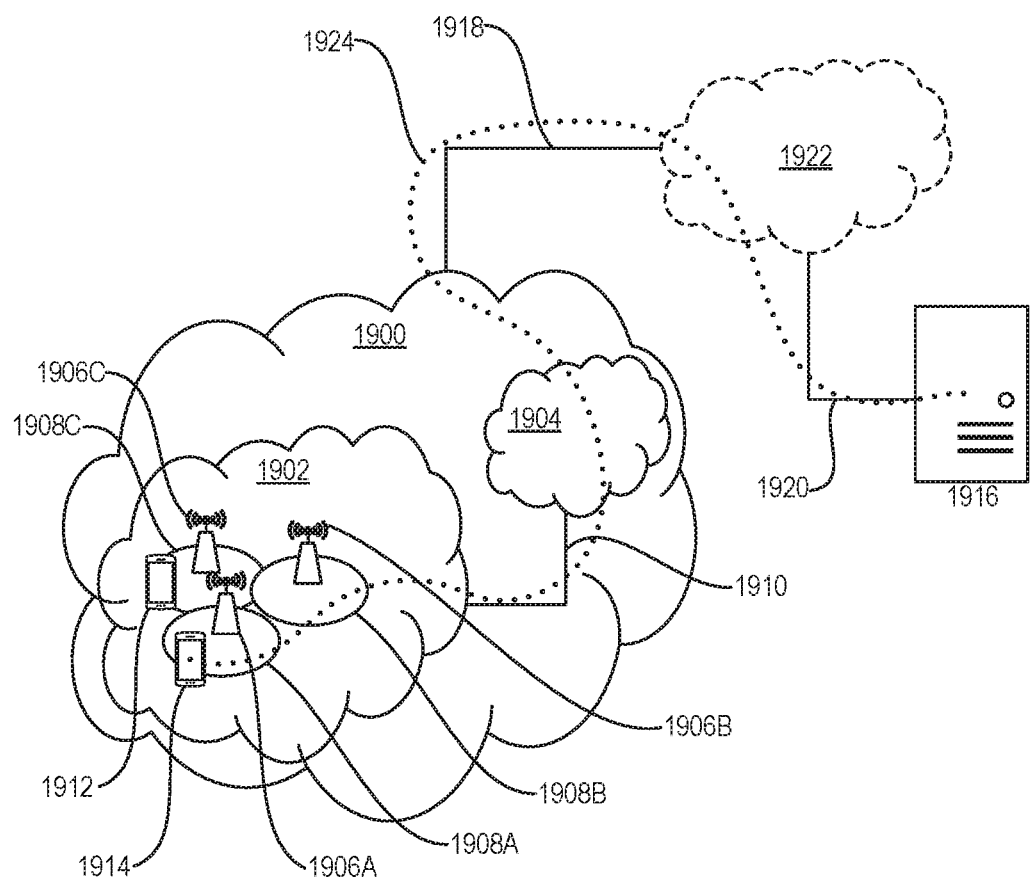
FIG. 19 illustrates a communication system includes a telecommunication network, such as a 3GPP-type cellular network, which comprises an access network, such as a RAN, and a core network, according to some embodiments of the present disclosure.

With reference to FIG. 19, in accordance with an embodiment, a communication system includes a telecommunication network 1900, such as a 3GPP-type cellular network, which comprises an access network 1902, such as a RAN, and a core network 1904. The access network 1902 comprises a plurality of base stations 1906A, 1906B, 1906C, such as Node Bs, eNBs, gNBs, or other types of wireless Access Points (APs), each defining a corresponding coverage area 1908A, 1908B, 1908C. Each base station 1906A, 1906B, 1906C is connectable to the core network 1904 over a wired or wireless connection 1910. A first UE 1912 located in coverage area 1908C is configured to wirelessly connect to, or be paged by, the corresponding base station 1906C. A second UE 1914 in coverage area 1908A is wirelessly connectable to the corresponding base station 1906A. While a plurality of UEs 1912, 1914 are illustrated in this example, the disclosed embodiments are equally applicable to a situation where a sole UE is in the coverage area or where a sole UE is connecting to the corresponding base station 1906.

The telecommunication network 1900 is itself connected to a host computer 1916, which may be embodied in the hardware and/or software of a standalone server, a cloud-implemented server, a distributed server, or as processing resources in a server farm. The host computer 1916 may be under the ownership or control of a service provider, or may be operated by the service provider or on behalf of the service provider. Connections 1918 and 1920 between the telecommunication network 1900 and the host computer 1916 may extend directly from the core network 1904 to the host computer 1916 or may go via an optional intermediate network 1922. The intermediate network 1922 may be one of, or a combination of more than one of, a public, private, or hosted network; the intermediate network 1922, if any, may be a backbone network or the Internet; in particular, the intermediate network 1922 may comprise two or more sub-networks (not shown).

The communication system of FIG. 19 as a whole enables connectivity between the connected UEs 1912, 1914 and the host computer 1916. The connectivity may be described as an Over-the-Top (OTT) connection 1924. The host computer 1916 and the connected UEs 1912, 1914 are configured to communicate data and/or signaling via the OTT connection 1924, using the access network 1902, the core network 1904, any intermediate network 1922, and possible further infrastructure (not shown) as intermediaries. The OTT connection 1924 may be transparent in the sense that the participating communication devices through which the OTT connection 1924 passes are unaware of routing of uplink and downlink communications. For example, the base station 1906 may not or need not be informed about the past routing of an incoming downlink communication with data originating from the host computer 1916 to be forwarded (e.g., handed over) to a connected UE 1912. Similarly, the base station 1906 need not be aware of the future routing of an outgoing uplink communication originating from the UE 1912 towards the host computer 1916.

Example implementations, in accordance with an embodiment, of the UE, base station, and host computer discussed in the preceding paragraphs will now be described with reference to FIG. 20. In a communication system 2000, a host computer 2002 comprises hardware 2004 including a communication interface 2006 configured to set up and maintain a wired or wireless connection with an interface of a different communication device of the communication system 2000. The host computer 2002 further comprises processing circuitry 2008, which may have storage and/or processing capabilities. In particular, the processing circuitry 2008 may comprise one or more programmable processors, ASICs, FPGAs, or combinations of these (not shown) adapted to execute instructions. The host computer 2002 further comprises software 2010, which is stored in or accessible by the host computer 2002 and executable by the processing circuitry 2008. The software 2010 includes a host application 2012. The host application 2012 may be operable to provide a service to a remote user, such as a UE 2014 connecting via an OTT connection 2016 terminating at the UE 2014 and the host computer 2002. In providing the service to the remote user, the host application 2012 may provide user data which is transmitted using the OTT connection 2016.

The communication system 2000 further includes a base station 2018 provided in a telecommunication system and comprising hardware 2020 enabling it to communicate with the host computer 2002 and with the UE 2014. The hardware 2020 may include a communication interface 2022 for setting up and maintaining a wired or wireless connection with an interface of a different communication device of the communication system 2000, as well as a radio interface 2024 for setting up and maintaining at least a wireless connection 2026 with the UE 2014 located in a coverage area (not shown in FIG. 20) served by the base station 2018. The communication interface 2022 may be configured to facilitate a connection 2028 to the host computer 2002. The connection 2028 may be direct or it may pass through a core network (not shown in FIG. 20) of the telecommunication system and/or through one or more intermediate networks outside the telecommunication system. In the embodiment shown, the hardware 2020 of the base station 2018 further includes processing circuitry 2030, which may comprise one or more programmable processors, ASICs, FPGAs, or combinations of these (not shown) adapted to execute instructions. The base station 2018 further has software 2032 stored internally or accessible via an external connection.

The communication system 2000 further includes the UE 2014 already referred to. The UE's 2014 hardware 2034 may include a radio interface 2036 configured to set up and maintain a wireless connection 2026 with a base station serving a coverage area in which the UE 2014 is currently located. The hardware 2034 of the UE 2014 further includes processing circuitry 2038, which may comprise one or more programmable processors, ASICs, FPGAs, or combinations of these (not shown) adapted to execute instructions. The UE 2014 further comprises software 2040, which is stored in or accessible by the UE 2014 and executable by the processing circuitry 2038. The software 2040 includes a client application 2042. The client application 2042 may be operable to provide a service to a human or non-human user via the UE 2014, with the support of the host computer 2002. In the host computer 2002, the executing host application 2012 may communicate with the executing client application 2042 via the OTT connection 2016 terminating at the UE 2014 and the host computer 2002. In providing the service to the user, the client application 2042 may receive request data from the host application 2012 and provide user data in response to the request data. The OTT connection 2016 may transfer both the request data and the user data. The client application 2042 may interact with the user to generate the user data that it provides.

Figure 20:
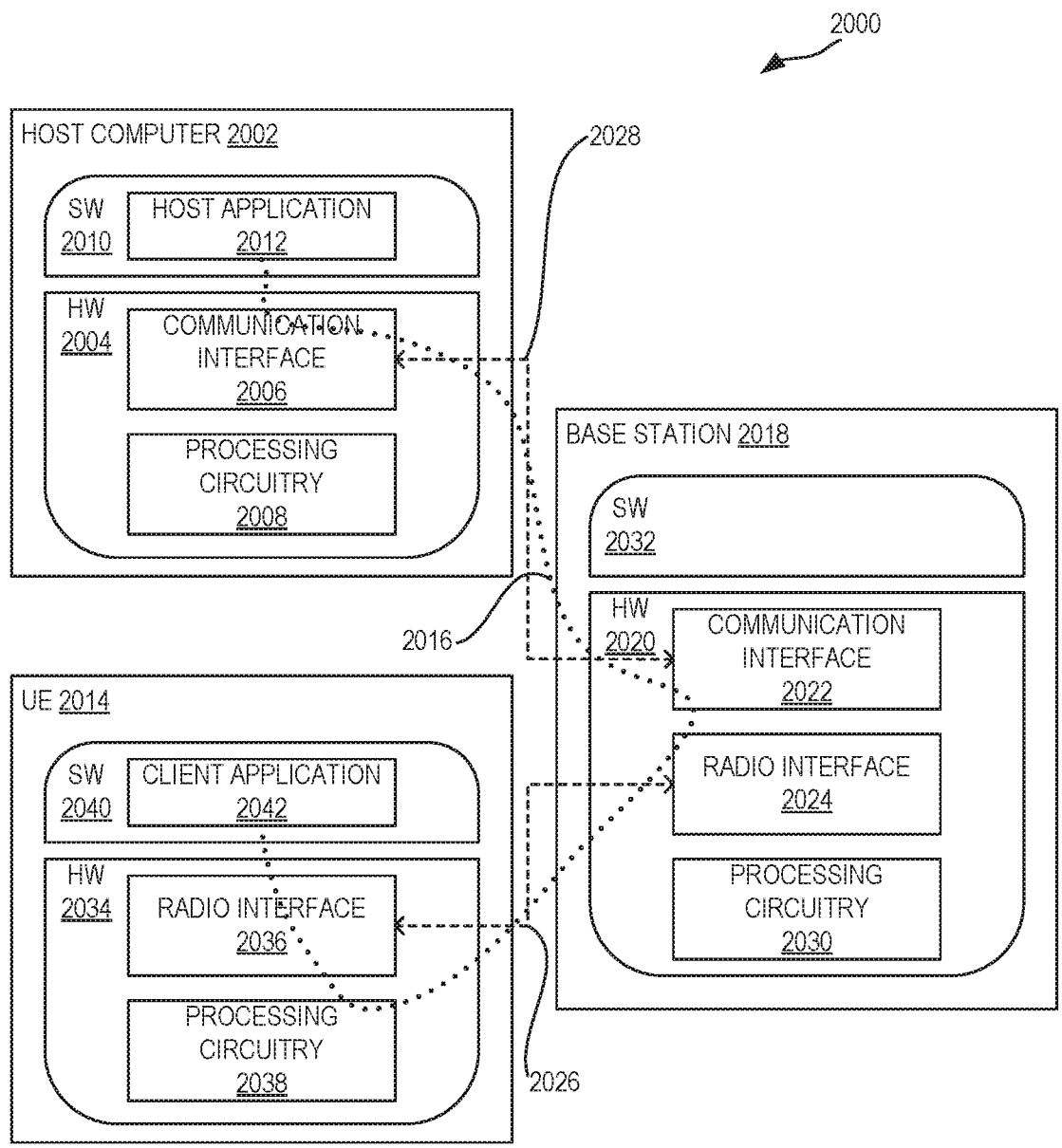
FIG. 20 illustrates a communication system, a host computer comprises hardware including a communication interface configured to set up and maintain a wired or wireless connection with an interface of a different communication device of the communication system, according to some embodiments of the present disclosure.

It is noted that the host computer 2002, the base station 2018, and the UE 2014 illustrated in FIG. 20 may be similar or identical to the host computer 1916, one of the base stations 1906A, 1906B, 1906C, and one of the UEs 1912, 1914 of FIG. 19, respectively. This is to say, the inner workings of these entities may be as shown in FIG. 20 and independently, the surrounding network topology may be that of FIG. 19.

In FIG. 20, the OTT connection 2016 has been drawn abstractly to illustrate the communication between the host computer 2002 and the UE 2014 via the base station 2018 without explicit reference to any intermediary devices and the precise routing of messages via these devices. The network infrastructure may determine the routing, which may be configured to hide from the UE 2014 or from the service provider operating the host computer 2002, or both. While the OTT connection 2016 is active, the network infrastructure may further take decisions by which it dynamically changes the routing (e.g., on the basis of load balancing consideration or reconfiguration of the network).

The wireless connection 2026 between the UE 2014 and the base station 2018 is in accordance with the teachings of the embodiments described throughout this disclosure. One or more of the various embodiments improve the performance of OTT services provided to the UE 2014 using the OTT connection 2016, in which the wireless connection 2026 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2016 between the host computer 2002 and the UE 2014, in response to variations in the measurement results. The measurement procedure and/or the network functionality for reconfiguring the OTT connection 2016 may be implemented in the software 2010 and the hardware 2004 of the host computer 2002 or in the software 2040 and the hardware 2034 of the UE 2014, or both. In some embodiments, sensors (not shown) may be deployed in or in association with communication devices through which the OTT connection 2016 passes; the sensors may participate in the measurement procedure by supplying values of the monitored quantities exemplified above, or supplying values of other physical quantities from which the software 2010, 2040 may compute or estimate the monitored quantities. The reconfiguring of the OTT connection 2016 may include message format, retransmission settings, preferred routing, etc.; the reconfiguring need not affect the base station 2018, and it may be unknown or imperceptible to the base station 2018. Such procedures and functionalities may be known and practiced in the art. In certain embodiments, measurements may involve proprietary UE signaling facilitating the host computer 2002's measurements of throughput, propagation times, latency, and the like. The measurements may be implemented in that the software 2010 and 2040 causes messages to be transmitted, in particular empty or 'dummy' messages, using the OTT connection 2016 while it monitors propagation times, errors, etc.

Figures 21, 22:
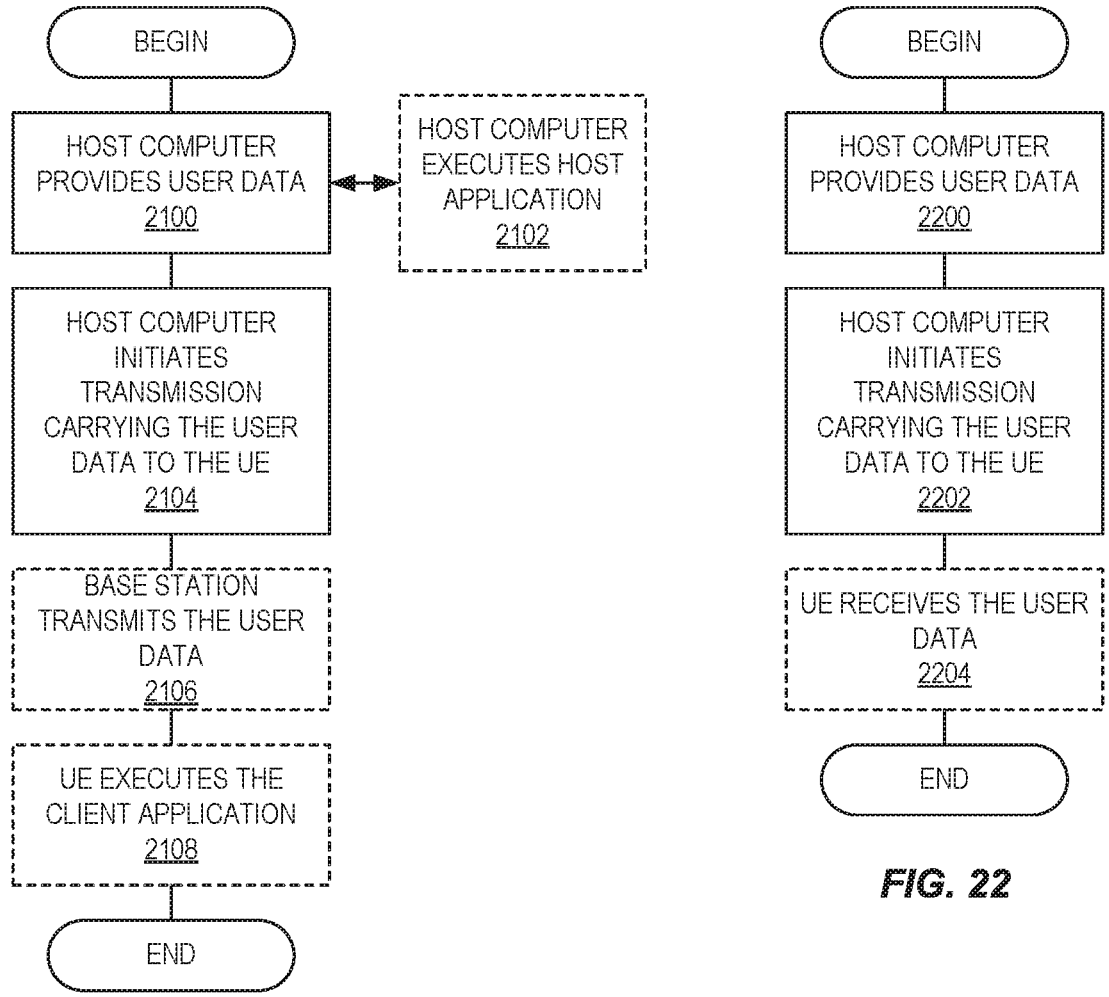
FIGS. 21 through 24 is a flowchart illustrating a method implemented in a communication system, in accordance with one embodiment.

FIG. 21 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 21 will be included in this section. In step 2100, the host computer provides user data. In sub-step 2102 (which may be optional) of step 2100, the host computer provides the user data by executing a host application. In step 2104, the host computer initiates a transmission carrying the user data to the UE. In step 2106 (which may be optional), the base station transmits to the UE the user data which was carried in the transmission that the host computer initiated, in accordance with the teachings of the embodiments described throughout this disclosure. In step 2108 (which may also be optional), the UE executes a client application associated with the host application executed by the host computer.

FIG. 22 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 22 will be included in this section. In step 2200 of the method, the host computer provides user data. In an optional sub-step (not shown) the host computer provides the user data by executing a host application. In step 2202, the host computer initiates a transmission carrying the user data to the UE. The transmission may pass via the base station, in accordance with the teachings of the embodiments described throughout this disclosure. In step 2204 (which may be optional), the UE receives the user data carried in the transmission.

Figures 23, 24:
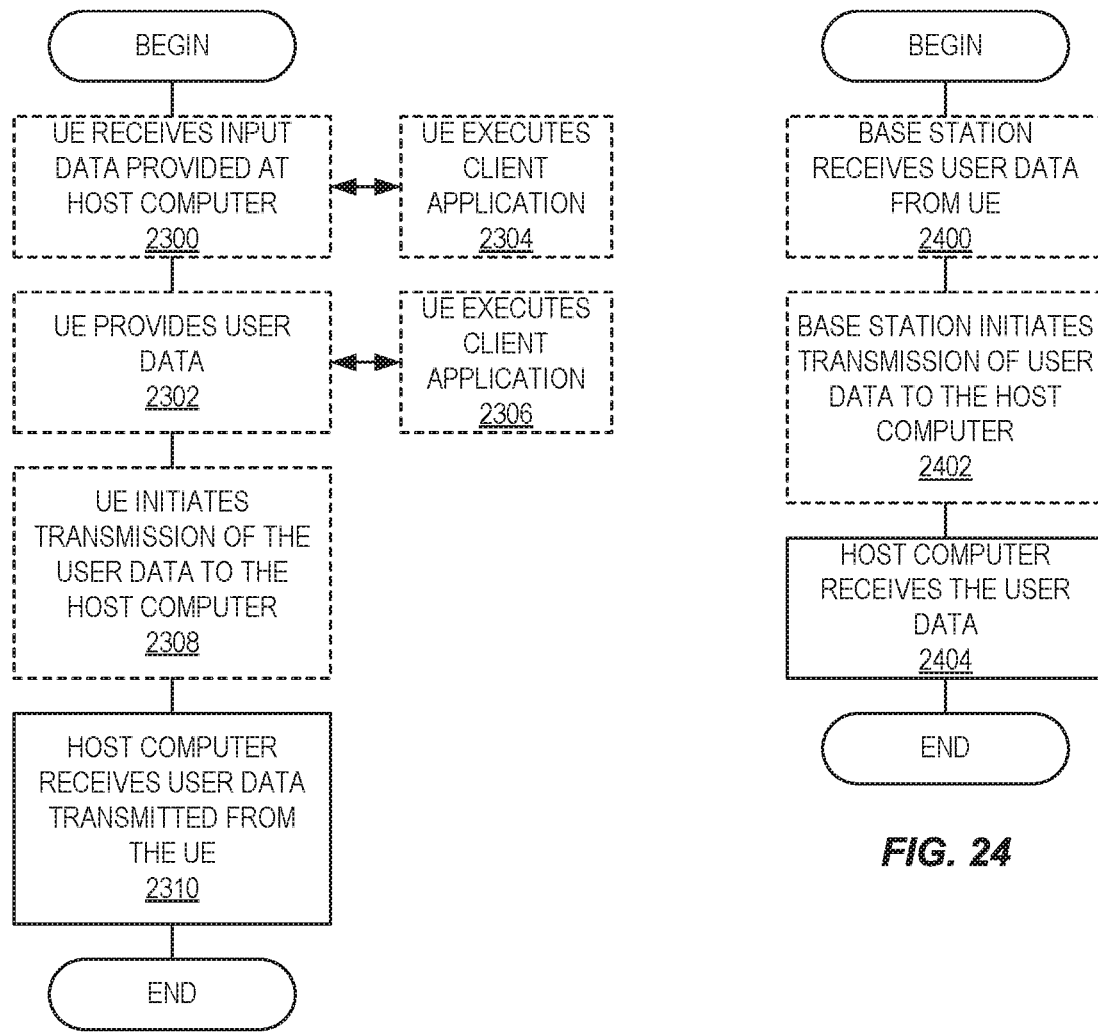

FIG. 23 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 23 will be included in this section. In step 2300 (which may be optional), the UE receives input data provided by the host computer. Additionally or alternatively, in step 2302, the UE provides user data. In sub-step 2304 (which may be optional) of step 2300, the UE provides the user data by executing a client application. In sub-step 2306 (which may be optional) of step 2302, the UE executes a client application which provides the user data in reaction to the received input data provided by the host computer. In providing the user data, the executed client application may further consider user input received from the user. Regardless of the specific manner in which the user data was provided, the UE initiates, in sub-step 2308 (which may be optional), transmission of the user data to the host computer. In step 2310 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 24 will be included in this section. In step 2400 (which may be optional), in accordance with the teachings of the embodiments described throughout this disclosure, the base station receives user data from the UE. In step 2402 (which may be optional), the base station initiates transmission of the received user data to the host computer. In step 2404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for non-codebook based Physical Uplink Shared Channel, PUSCH, transmission, the method comprising one or more of: receiving (500) a configuration of a first or second Uplink, UL, Phase-Tracking Reference Signals, PT-RS, port index per Sounding Reference Signal, SRS, resource in up to two SRS resource sets; receiving (502) an indication of at least one of: a first set of SRS Resource Indicators, SRIs, from a first SRS resource set; and a second set of SRIs from a second SRS resource set; determining (504) at least one of: i. a first number of UL PT-RS ports to be transmitted according to the SRS resources indicated in the first set of SRIs; and ii.a second number of UL PT-RS ports to be transmitted according to the SRS resources indicated in the second set of SRIs; and transmitting (506) the determined number of UL PT-RS ports along with a plurality of PUSCH repetitions.

Embodiment 2: The method of embodiment 1 wherein a first subset of PUSCH repetitions are transmitted according to the SRS resources indicated in the first set of SRIs and the first subset of PUSCH repetitions include transmission of the first number of UL PT-RS ports.

Embodiment 3: The method of embodiment 1 wherein a second subset of PUSCH repetitions, disjoint from the first subset of PUSCH repetitions, are transmitted according to the SRS resources indicated in the second set of SRIs and the second subset of PUSCH repetitions include transmission of the second number of UL PT-RS ports.

Embodiment 4: The method of embodiment 1 wherein all of the PUSCH repetitions are transmitted according to the SRS resources indicated in the first set of SRIs and the PUSCH repetitions include transmission of the first number of UL PT-RS ports.

Embodiment 5: The method of embodiment 1 wherein all of the PUSCH repetitions are transmitted according to the SRS resources indicated in the second set of SRIs and the PUSCH repetitions include transmission of the second number of UL PT-RS ports.

Embodiment 6: The method of any of embodiments 1 to 3 wherein the first number of UL PT-RS ports is the same as the second number of uplink PT-RS ports.

Embodiment 7: The method of any of embodiments 1 to 3 wherein the first number of UL PT-RS ports is different from the second number of UL PT-RS ports.

Embodiment 8: The method of any of embodiments 1 to 7 wherein the first number of UL PT-RS ports is determined to be one when the SRS resources indicated in the first set of SRIs all have the same PT-RS port index configured.

Embodiment 9: The method of any one of embodiments 1 to 7 wherein the second number of UL PT-RS ports is determined to be one when the SRS resources indicated in the second set of SRIs all have the same PT-RS port index configured.

Embodiment 10: The method of any of embodiments 1 to 7 wherein the first number of uplink PT-RS ports is determined to be two when the SRS resources indicated in the first set of SRIs have two different PT-RS port index values configured.

Embodiment 11: The method of any of embodiments 1 to 7 wherein the second number of uplink PT-RS ports is determined to be two when the SRS resources indicated in the second set of SRIs have two different PT-RS port index values configured.

Embodiment 12: The method of any of embodiments 1 to 11 wherein the first set of SRIs and the second set of SRIs are respectively indicated via a first SRI field and a second SRI field in a Downlink Control Indicator, DCI, scheduling the PUSCH repetition.

Embodiment 13: The method of any of embodiments 1 to 11 wherein the first set of SRIs and the second set of SRIs are respectively indicated via a first index and a second index configured as part of configured grant PUSCH configuration.

Embodiment 14: The method of any of embodiments 1 to 13 wherein the first SRS resource set corresponds to a first Transmit and Reception Point, TRP, and the second SRS resource set corresponds to a second TRP.

Embodiment 15: The method of any of the previous embodiments, further comprising: providing user data; and forwarding the user data to a host computer via the transmission to the base station.

Group B Embodiments

Embodiment 16: A method performed by a base station for non-codebook based Physical Uplink Shared Channel, PUSCH, reception, the method comprising: transmitting (600) configuration of a first or second Uplink, UL, Phase-Tracking Reference Signals, PT-RS, port index per Sounding Reference Signal, SRS, resource in up to two SRS resource sets; transmitting (602) an indication of at least one of: a first set of SRS Resource Indicators, SRIs, from a first SRS resource set; and a second set of SRIs from a second SRS resource set; determining (604) at least one of: i. a first number of UL PT-RS ports to be received according to the SRS resources indicated in the first set of SRIs; and ii. a second number of UL PT-RS ports to be received according to the SRS resources indicated in the second set of SRIs; and receiving (606) the determined number of UL PT-RS ports along with a plurality of PUSCH repetitions.

Embodiment 17: The method of embodiment 16 wherein a first subset of PUSCH repetitions are received according to the SRS resources indicated in the first set of SRIs and the first subset of PUSCH repetitions include reception of the first number of UL PT-RS ports.

Embodiment 18: The method of embodiment 16 wherein a second subset of PUSCH repetitions, disjoint from the first subset of PUSCH repetitions, are received according to the SRS resources indicated in the second set of SRIs and the second subset of PUSCH repetitions include reception of the second number of UL PT-RS ports.

Embodiment 19: The method of embodiment 16 wherein all of the PUSCH repetitions are received according to the SRS resources indicated in the first set of SRIs and the PUSCH repetitions include reception of the first number of UL PT-RS ports.

Embodiment 20: The method of embodiment 16 wherein all of the PUSCH repetitions are transmitted according to the SRS resources indicated in the second set of SRIs and the PUSCH repetitions include transmission of the second number of UL PT-RS ports.

Embodiment 21: The method of any of embodiments 16 to 18 wherein the first number of UL PT-RS ports is the same as the second number of uplink PT-RS ports.

Embodiment 22: The method of any of embodiments 16 to 18 wherein the first number of UL PT-RS ports is the different from the second number of UL PT-RS ports.

Embodiment 23: The method of any of embodiments 16 to 22 wherein the first number of UL PT-RS ports is determined to be one when the SRS resources indicated in the first set of SRIs all have the same PT-RS port index configured.

Embodiment 24: The method of any of embodiments 16 to 22 wherein the second number of uplink PT-RS ports is determined to be two when the SRS resources indicated in the second set of SRIs have two different PT-RS port index values configured.

Embodiment 25: The method of any of embodiments 16 to 24 wherein the first set of SRIs and the second set of SRIs are respectively indicated via a first SRI field and a second SRI field in a Downlink Control Indicator, DCI, scheduling the PUSCH repetition.

Embodiment 26: The method of any of embodiments 16 to 24 wherein the first set of SRIs and the second set of SRIs are respectively indicated via a first index and a second index configured as part of configured grant PUSCH configuration.

Embodiment 27: The method of any of embodiments 16 to 26 wherein the first SRS resource set corresponds to a first Transmit and Reception Point, TRP, and the second SRS resource set corresponds to a second TRP.

Embodiment 28: The method of any of the previous embodiments, further comprising: obtaining user data; and forwarding the user data to a host computer or a wireless device.

Group C Embodiments

Embodiment 29: A wireless device for non-codebook based Physical Uplink Shared Channel, PUSCH, transmission, the wireless device comprising: processing circuitry configured to perform any of the steps of any of the Group A embodiments; and power supply circuitry configured to supply power to the wireless device.

Embodiment 30: A base station for non-codebook based Physical Uplink Shared Channel, PUSCH, reception, the base station comprising: processing circuitry configured to perform any of the steps of any of the Group B embodiments; and power supply circuitry configured to supply power to the base station.

Embodiment 31: A User Equipment, UE, for non-codebook based Physical Uplink Shared Channel, PUSCH, transmission, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 32: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 33: The communication system of the previous embodiment further including the base station.

Embodiment 34: The communication system of the previous 2 embodiments, further including the UE, wherein the UE is configured to communicate with the base station.

Embodiment 35: The communication system of the previous 3 embodiments, wherein: the processing circuitry of the host computer is configured to execute a host application, thereby providing the user data; and the UE comprises processing circuitry configured to execute a client application associated with the host application.

Embodiment 36: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 37: The method of the previous embodiment, further comprising, at the base station, transmitting the user data.

Embodiment 38: The method of the previous 2 embodiments, wherein the user data is provided at the host computer by executing a host application, the method further comprising, at the UE, executing a client application associated with the host application.

Embodiment 39: A User Equipment, UE, configured to communicate with a base station, the UE comprising a radio interface and processing circuitry configured to perform the method of the previous 3 embodiments.

Embodiment 40: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 41: The communication system of the previous embodiment, wherein the cellular network further includes a base station configured to communicate with the UE.

Embodiment 42: The communication system of the previous 2 embodiments, wherein: the processing circuitry of the host computer is configured to execute a host application, thereby providing the user data; and the UE's processing circuitry is configured to execute a client application associated with the host application.

Embodiment 43: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 44: The method of the previous embodiment, further comprising at the UE, receiving the user data from the base station.

Embodiment 45: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 46: The communication system of the previous embodiment, further including the UE.

Embodiment 47: The communication system of the previous 2 embodiments, further including the base station, wherein the base station comprises a radio interface configured to communicate with the UE and a communication interface configured to forward to the host computer the user data carried by a transmission from the UE to the base station.

Embodiment 48: The communication system of the previous 3 embodiments, wherein: the processing circuitry of the host computer is configured to execute a host application; and the UE's processing circuitry is configured to execute a client application associated with the host application, thereby providing the user data.

Embodiment 49: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 50: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 51: The method of the previous embodiment, further comprising, at the UE, providing the user data to the base station.

Embodiment 52: The method of the previous 2 embodiments, further comprising: at the UE, executing a client application, thereby providing the user data to be transmitted; and at the host computer, executing a host application associated with the client application.

Embodiment 53: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data Embodiment 54: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 55: The communication system of the previous embodiment further including the base station.

Embodiment 56: The communication system of the previous 2 embodiments, further including the UE, wherein the UE is configured to communicate with the base station.

Embodiment 57: The communication system of the previous 3 embodiments, wherein: the processing circuitry of the host computer is configured to execute a host application; and the UE is configured to execute a client application associated with the host application, thereby providing the user data to be received by the host computer.

Embodiment 58: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 59: The method of the previous embodiment, further comprising at the base station, receiving the user data from the UE.

Embodiment 60: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device for non-codebook based Physical Uplink Shared Channel, PUSCH, transmission, the method comprising:
   receiving a configuration of a first or second Uplink, UL, Phase-Tracking Reference Signal, PT-RS, port index per Sounding Reference Signal, SRS, resource among a plurality of SRS resources configured in two SRS resource sets for a non-codebook based PUSCH;
   receiving an indication of at least one of: a first set of SRS Resource Indicators, SRIs, indicating SRS resources from a first SRS resource set; and a second set of SRIs indicating SRS resources from a second SRS resource set;
   determining at least one of:
      a first number of UL PT-RS ports to be transmitted according to SRS resources indicated in the first set of SRIs; and
      a second number of UL PT-RS ports to be transmitted according to SRS resources indicated in the second set of SRIs; and
   transmitting the determined number of UL PT-RS ports along with a plurality of PUSCH repetitions.

2. The method of claim 1 wherein a first subset of PUSCH repetitions among the plurality of PUSCH repetitions are transmitted according to the SRS resources indicated in the first set of SRIs and the first subset of PUSCH repetitions include transmission of the first number of UL PT-RS ports.

3. The method of claim 1 wherein a second subset of PUSCH repetitions among the plurality of PUSCH repetitions, disjointed from a first subset of PUSCH repetitions, are transmitted according to the SRS resources indicated in the second set of SRIs and the second subset of PUSCH repetitions include transmission of the second number of UL PT-RS ports.

4. The method of claim 1 wherein the plurality of PUSCH repetitions are transmitted according to the SRS resources indicated in the first set of SRIs, and the plurality of PUSCH repetitions include transmission of the first number of UL PT-RS ports.

5. The method of claim 1 wherein the plurality of PUSCH repetitions are transmitted according to the SRS resources indicated in the second set of SRIs and the plurality of PUSCH repetitions include transmission of the second number of UL PT-RS ports.

6. The method of claim 1 wherein the first number of UL PT-RS ports is the same as the second number of uplink PT-RS ports.

7. The method of claim 1 wherein the first number of UL PT-RS ports is different from the second number of UL PT-RS ports.

8. The method of claim 1 wherein the first number of UL PT-RS ports is determined to be one when the SRS resources indicated in the first set of SRIs all have a same PT-RS port index configured.

9. The method of claim 1 wherein the second number of UL PT-RS ports is determined to be one when the SRS resources indicated in the second set of SRIs all have a same PT-RS port index configured.

10. The method of claim 1 wherein the first set of SRIs and the second set of SRIs are respectively indicated via a first SRI field and a second SRI field in a Downlink Control Indicator, DCI, scheduling the PUSCH repetition.

11. The method of claim 1 wherein the first set of SRIs and the second set of SRIs are respectively indicated via a first index and a second index configured as part of configured grant PUSCH configuration.

12. The method of claim 1 wherein the first SRS resource set corresponds to a first Transmit and Reception Point, TRP, and the second SRS resource set corresponds to a second TRP.

13. The method of claim 1 comprising receiving an indication of both the first set of SRS Resource Indicators, SRIs, indicating SRS resources from a first SRS resource set and the second set of SRIs indicating SRS resources from a second SRS resource set.

14. The method of claim 1 comprising determining both the first number of UL PT-RS ports to be transmitted according to SRS resources indicated in the first set of SRIs and the second number of UL PT-RS ports to be transmitted according to SRS resources indicated in the second set of SRIs.

15. The method of claim 1 wherein transmitting determined number of UL PT-RS ports along with the plurality of PUSCH repetitions comprises transmitting the determined UL PT-RS ports along with the plurality of PUSCH repetitions.

16. A method performed by a base station for non-codebook based Physical Uplink Shared Channel, PUSCH, reception, the method comprising:
transmitting configuration of a first or second Uplink, UL, Phase-Tracking Reference Signals, PT-RS, port index per Sounding Reference Signal, SRS, resource among a plurality of SRS resources configured in two SRS resource sets for non-codebook based PUSCH;
transmitting an indication of at least one of: a first set of SRS Resource Indicators, SRIs, indicating SRS resources from a first SRS resource set; and a second set of SRIs indicating SRS resources from a second SRS resource set;
determining at least one of:
a first number of UL PT-RS ports to be received according to SRS resources indicated in the first set of SRIs; and
a second number of UL PT-RS ports to be received according to SRS resources indicated in the second set of SRIs; and
receiving the determined number of UL PT-RS ports along with a plurality of PUSCH repetitions.

17. The method of claim 16 wherein a first subset of PUSCH repetitions among the plurality of PUSCH repetitions are received according to the SRS resources indicated in the first set of SRIs and the first subset of PUSCH repetitions include reception of the first number of UL PT-RS ports.

18. The method of claim 16 wherein a second subset of PUSCH repetitions among the plurality of PUSCH repetitions, disjointed from a first subset of PUSCH repetitions, are received according to the SRS resources indicated in the second set of SRIs and the second subset of PUSCH repetitions include reception of the second number of UL PT-RS ports.

19. The method of claim 16 wherein the plurality of PUSCH repetitions are received according to the SRS resources indicated in the first set of SRIs and the plurality of PUSCH repetitions include reception of the first number of UL PT-RS ports.

20. The method of claim 16 wherein the plurality of PUSCH repetitions are transmitted according to the SRS resources indicated in the second set of SRIs and the plurality of PUSCH repetitions include transmission of the second number of UL PT-RS ports.

21. The method of claim 16 wherein the first number of UL PT-RS ports is the same as the second number of uplink PT-RS ports.

22. The method of claim 16 wherein the first number of UL PT-RS ports is the different from the second number of UL PT-RS ports.

23. The method of claim 16 wherein the first set of SRIs and the second set of SRIs are respectively indicated via a first SRI field and a second SRI field in a Downlink Control Indicator, DCI, scheduling the PUSCH repetition.

24. The method of claim 16 wherein the first set of SRIs and the second set of SRIs are respectively indicated via a first index and a second index configured as part of configured grant PUSCH configuration.

25. The method of claim 16 wherein the first SRS resource set corresponds to a first Transmit and Reception Point, TRP, and the second SRS resource set corresponds to a second TRP.

26. The method of claim 16 wherein receiving the determined number of UL PT-RS ports along with the plurality of PUSCH repetitions comprises receiving the determined UL PT-RS ports along with the plurality of PUSCH repetitions.

27. A wireless device comprising one or more processors configured to cause the wireless device to:
receive a configuration of a first or second Uplink, UL, Phase-Tracking Reference Signals, PT-RS, port index per Sounding Reference Signal, SRS, resource among a plurality of SRS resources configured in two SRS resource sets for non-codebook based PUSCH;
receive an indication of at least one of: a first set of SRS Resource Indicators, SRIs, indicating SRS resources from a first SRS resource set; and a second set of SRIs indicating SRS resources from a second SRS resource set;
determine at least one of:
a first number of UL PT-RS ports to be transmitted according to SRS resources indicated in the first set of SRIs; and
a second number of UL PT-RS ports to be transmitted according to SRS resources indicated in the second set of SRIs; and
transmit the determined number of UL PT-RS ports along with a plurality of PUSCH repetitions.

28. A base station comprising one or more processors configured to cause the base station to:
transmit configuration of a first or second Uplink, UL, Phase-Tracking Reference Signals, PT-RS, port index per Sounding Reference Signal, SRS, resource among a plurality of SRS resources configured in two SRS resource sets for non-codebook based PUSCH;

transmit an indication of at least one of: a first set of SRS Resource Indicators, SRIs, indicating SRS resources from a first SRS resource set; and a second set of SRIs indicating SRS resources from a second SRS resource set;

determine at least one of:
- a first number of UL PT-RS ports to be received according to SRS resources indicated in the first set of SRIs; and
- a second number of UL PT-RS ports to be received according to SRS resources indicated in the second set of SRIs; and
- receive the determined number of UL PT-RS ports along with a plurality of PUSCH repetitions.

* * * * *